US012558665B2

(12) United States Patent
De Best et al.

(10) Patent No.: US 12,558,665 B2
(45) Date of Patent: Feb. 24, 2026

(54) COOLING OF TUBE CONTAINING REACTANTS

(71) Applicant: SIGNIFY HOLDING B.V., Eindhoven (NL)

(72) Inventors: Anna Wilhelmina Maria De Best, Veldhoven (NL); Remy Cyrille Broersma, Eindhoven (NL); Norbertus Antonius Maria Sweegers, Lierop (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 715 days.

(21) Appl. No.: 17/912,848

(22) PCT Filed: Mar. 17, 2021

(86) PCT No.: PCT/EP2021/056845
§ 371 (c)(1),
(2) Date: Sep. 19, 2022

(87) PCT Pub. No.: WO2021/191027
PCT Pub. Date: Sep. 30, 2021

(65) Prior Publication Data
US 2023/0182107 A1     Jun. 15, 2023

(30) Foreign Application Priority Data

Mar. 24, 2020    (EP) .................................... 20165109

(51) Int. Cl.
*B01J 19/24*      (2006.01)
*B01J 19/00*      (2006.01)
*B01J 19/12*      (2006.01)
(52) U.S. Cl.
CPC ......... *B01J 19/243* (2013.01); *B01J 19/0013* (2013.01); *B01J 19/123* (2013.01);
(Continued)

(58) Field of Classification Search
CPC .... B01J 19/243; B01J 19/0013; B01J 19/123; B01J 19/127; B01J 19/128;
(Continued)

(56) References Cited

U.S. PATENT DOCUMENTS 6,942,767 B1      9/2005  Fazzina et al.
2010/0267125 A1  10/2010  Erb et al.
(Continued)

FOREIGN PATENT DOCUMENTS

CN        204083955 U     1/2015
CN        105841363 A     8/2016
(Continued)

OTHER PUBLICATIONS

Benjamin D.A. Hook, et al, "A Practical Flow Reactor for Continuous Organic Photochemistry", Journal of Organomentallic Chemistry, vol. 70, pp. 7558-7564, Jan. 1, 2005; ISSN: 0022-328X, DOI: 10.1021/JO050705P.

*Primary Examiner* — Lessanework Seifu

(57)                ABSTRACT

The invention provides a reactor assembly (1) comprising a reactor (30), wherein the reactor (30) is configured for hosting a fluid (100) to be treated with light source radiation (11) selected from one or more of UV radiation, visible radiation, and IR radiation, wherein the reactor (30) comprises a reactor wall (35) which is transmissive for the light source radiation (11), wherein: the reactor (30) is a tubular reactor (130), and wherein the reactor wall (35) defines the tubular reactor (130); the tubular reactor (130) is configured in a tubular arrangement (1130); the reactor assembly (1) further comprises a reactor support element (40), wherein the reactor support element (40) comprises a track (42), wherein the track (42) partly encloses the tubular reactor (130), wherein the reactor support element (40) comprises a thermally conductive element (2), and wherein the tubular reactor (130) is configured in thermal contact with the thermally conductive element (2).

15 Claims, 8 Drawing Sheets

(52) U.S. Cl.
CPC ........... *B01J 19/127* (2013.01); *B01J 19/128* (2013.01); *B01J 2219/00081* (2013.01); *B01J 2219/00092* (2013.01); *B01J 2219/192* (2013.01)

(58) Field of Classification Search
CPC ........ B01J 2219/00092; B01J 2219/192; B01J 2219/0871
See application file for complete search history.

(56) References Cited

U.S. PATENT DOCUMENTS

| | | |
|---|---|---|
| 2016/0017266 A1 | 1/2016 | Morgan |
| 2018/0305226 A1 | 10/2018 | Simpson et al. |
| 2018/0362368 A1 | 12/2018 | Kustermans et al. |

FOREIGN PATENT DOCUMENTS

| | | |
|---|---|---|
| CN | 107486115 A | 12/2017 |
| CN | 110354778 A | 10/2019 |
| DE | 102014012218 A1 | 2/2016 |
| JP | 2004066045 A | 3/2004 |
| JP | 2004089941 A | 3/2004 |
| JP | 2018167195 A | 11/2018 |
| KR | 20130116396 A | 10/2013 |
| WO | 2007129327 A1 | 11/2007 |
| WO | 2010004028 A1 | 1/2010 |
| WO | 2013030247 A1 | 3/2013 |
| WO | 2017181125 A1 | 10/2017 |
| WO | 2019008092 A1 | 1/2019 |

COOLING OF TUBE CONTAINING REACTANTS

CROSS-REFERENCE TO PRIOR APPLICATIONS

This application is the U.S. National Phase application under 35 U.S.C. § 371 of International Application No. PCT/EP2021/056845, filed on Mar. 17, 2021, which claims the benefit of European Patent Application No. 20165109.8, filed on Mar. 25, 2020. These applications are hereby incorporated by reference herein.

FIELD OF THE INVENTION

The invention relates to a photoreactor assembly and a method for treating a fluid with light source radiation.

BACKGROUND OF THE INVENTION

Reactor systems for photo(chemical) processing a fluid are known in the art. US2016/0017266 for instance describes a photobioreactor for use in treating polluted air and producing biomass that may comprise, at least in part, a generally vertical tube or fluidic pathway, a generally vertical helical tube or fluidic pathway having a light source partially positioned within the helical fluidic pathway, a head cap assembly, and a base assembly. In one example, the light source may be a light emitting diode or a plurality of light emitting diodes (LEDs).

SUMMARY OF THE INVENTION

Photochemical processing or photochemistry relates to the chemical effect of light. More in general photochemistry refers to a (chemical) reaction caused by absorption of light, especially ultraviolet light (radiation), visible light (radiation) and/or infrared radiation (light). Photochemistry may for instance be used to synthesize specific products. For instance, isomerization reactions or radical reactions may be initiated by light. Other naturally occurring processes that are induced by light are e.g. photosynthesis, or the formation of vitamin D with sunlight. Photochemistry may further e.g. be used to degrade/oxidize pollutants in water or, e.g., air. Photochemical reactions may be carried out in a photochemical reactor or "photoreactor".

One of the benefits of photochemistry is that reactions can be performed at lower temperatures than conventional thermal chemistry and partly for that reason thermal side reactions that generate unwanted by-products are avoided.

Commonly used light sources in photochemistry are low or medium pressure mercury lamps or fluorescent lamps. In addition to that, some reactions require a very specific wavelength region, and they may even be hampered by light from the source emitted at other wavelengths. In these cases, part of the spectrum, has to be filtered out, leading to a low efficiency and complex reactor design.

In the recent years the output of Light Emitting Diodes (LEDs), both direct LEDs with dominant wavelengths ranging for instance from UVC to IR wavelengths, and phosphor-converted LEDs, has increased drastically, making them interesting candidates for light sources for photochemistry. High fluxes can be obtained from small surfaces, especially if the LEDs can be kept at a low temperature. High fluxes though may result in extensive heat being produced in the reactor assembly and especially in the reactor caused by absorption of the "unused" irradiation, which in turn may result in unwanted by-products and/or a reduction in the efficiency of the LEDs. A desire for cooling, may require a reconfiguration of the reactor and/or the assembly comprising the reactor.

Hence, it is an aspect of the invention to provide an alternative reactor assembly, which preferably further at least partly obviates one or more of above-described drawbacks. It is further an aspect of the invention to provide an alternative (photochemical) method for treating a fluid with light, which preferably further at least partly obviates one or more of above-described drawbacks. It is yet a further aspect of the invention to provide a method for providing such reactor assembly which preferably further at least partly obviates one or more of above-described drawbacks. The present invention may have as object to overcome or ameliorate at least one of the disadvantages of the prior art, or to provide a useful alternative.

Therefore, in a first aspect, the invention provides a reactor assembly ("assembly") comprising a reactor, wherein the reactor is configured for hosting a fluid (also: "reactor fluid") to be treated, especially with light source radiation. The (reactor) fluid in embodiments comprise one or more liquids. The (reactor) fluid may comprise one or more gases. In yet further embodiments, the fluid may comprise a mixture of gas(es) and liquid(s). The light source radiation may in embodiments comprise UV radiation. The light source radiation may in further embodiments (also) comprise visible radiation. In yet further embodiments, the light source radiation may (also) comprise IR radiation. In specific embodiments, the light source radiation may be selected from one or more of UV radiation, visible radiation, and IR radiation. The reactor especially comprises a reactor wall. In specific embodiments, the reactor wall is (at least partly) transmissive for the light source radiation. The reactor is especially a tubular reactor, especially wherein the reactor wall defines the tubular reactor. The tubular reactor may be configured in a tubular arrangement. In further embodiments, the reactor assembly further comprises a reactor support element ("support element"). The reactor support element may in embodiments comprise a track (such as a groove pattern). In further specific embodiments the track partly encloses the tubular reactor. In specific embodiments, the reactor support element comprises a thermally conductive element. The tubular reactor is especially configured in thermal contact with the reactor support element. Therefore, especially the invention provides in embodiments a reactor assembly comprising a reactor, wherein the reactor is configured for hosting a fluid to be treated with light source radiation selected from one or more of UV radiation, visible radiation, and IR radiation, wherein the reactor comprises a reactor wall which is transmissive for the light source radiation, wherein: (i) the reactor is a tubular reactor, and wherein the reactor wall defines the tubular reactor; (ii) the tubular reactor is configured in a tubular arrangement; (iii) the reactor assembly further comprises a reactor support element; wherein the reactor support element comprises a track, wherein the track partly encloses the tubular reactor, wherein the reactor support element comprises a thermally conductive element, and wherein the tubular reactor is configured in thermal contact with the thermally conductive element.

In such reactor assembly, cooling of the reactor may be performed at high efficiency. In such reactor assembly high fluxes of light/radiation may be provided to the reactor. Moreover, the corresponding heat input may efficiently be dissipated. In the assembly, high temperatures of the fluid may be prevented. The temperature of the fluid may be controlled. As such, high energy may be provided to reactants in the reactor and especially a reaction temperature may be controlled.

Especially, in specific embodiments, the reactor assembly comprises a photoreactor assembly that appears to be highly efficient in terms of light/radiation output of the light source versus power input of the light source. The photoreactor assembly may further be highly efficient in capturing of the light/radiation by the reactants. In the reactor, reactions may be executed more efficiently compared to prior art solutions. An increased amount of energy may be provided to the reactor based on the improved cooling. A such a higher yield (per time unit) of the desired product may be obtained in the reactor assembly compared to prior art systems. Embodiments described below may further enhance/improve abovementioned effects such as for example cooling of the reactor may be performed at high efficiency while high fluxes of light/radiation may be provided to the reactor.

The reactor assembly may be used for treating a fluid with light source radiation, such as in the method of the invention. The term "treating the fluid (with light source radiation)" may especially relate to irradiating the fluid with the light source radiation. The fluid especially comprises a photosensitive reactant (including photocatalyst and/or photosensitizer), especially sensitive to the light source radiation (see below). The term "(reactor) fluid" may relate to a plurality of (different) fluids. Further, the fluid may comprise a liquid and/or a gas. Moreover, the fluid may in embodiments enter the reactor as a liquid and may (partly) become gaseous when being heated in the reactor. Hence, the fluid may comprise the liquid phase and the gaseous phase or a combination of gaseous and liquid phases. The fluid may comprise a mix of different fluids.

The light source radiation may be provided by (the plurality of) light sources. To efficiently provide the light source radiation to the reactor, the light sources may be arranged close to the tube. In further embodiment, e.g. the light sources may be comprised by the reactor assembly (see below). When providing light source radiation to the fluid, the light source may simultaneously provide heat and may increase the temperature in the reactor assembly and especially may (also) increase the temperature of the fluid (during operations). To control the temperature in the reactor assembly, the assembly is especially configured for dissipating heat generated in the reactor assembly. The reactor assembly is especially configured for dissipating heat from (the fluid in) the reactor (especially heat provided to the fluid).

The assembly comprises the reactor support element especially for supporting the (tubular) reactor. The support element is especially configured (at least partly) encompassing a (tubular) arrangement axis (of the tubular arrangement). The tube of the tubular reactor is especially (thermally) connected to the support element. In embodiments, the tubular reactor is arranged closer to the tubular arrangement axis than the support element. In further embodiments, support element is arranged closer to the tubular arrangement axis than the tubular reactor. The support element may, e.g., comprise a cylindrical shaped elongated body or e.g. define an elongated body with a polygonal shape (or cross section) (in a planar projection). The tube is in embodiments helically coiled around the reactor support element. A plurality (or one) of tube windings or turns may be configured around the reactor support element. In further embodiments, the tube is enclosed by the support element. The tube may e.g. be coiled inside the (elongated) support element.

The reactor support element ("support element") is further especially configured for dissipating heat from (the fluid in) the reactor. The support element especially comprises the track, and in embodiments the track partly encloses the tubular reactor. Herein, such configuration of the track and the tubular reactor may also be referred to as "enclosing configuration". The support element may support heat transfer from the reactor, especially from the fluid, to the reactor support element, and optionally away from the reactor support element to external of the support element.

A heat transfer rate from the fluid, especially from the reactor, to the support element especially depends on an overall thermal resistance in a thermal conductive path from the fluid (at the upstream end of the conductive path) to the support element (further downstream of the conductive path) and on a temperature difference between the fluid, especially the reactor, and the support element. The overall heat resistance may be a result of the thermal resistance of successive elements in such conductive path. The heat transfer rate may further be affected by a (2-dimensional) size or dimension of the conductive path. Such size or dimension e.g. relates to a cross section of the conductive path (perpendicular to a direction of the heat flow). In embodiments, the reactor assembly may be configured for an optimized, especially maximized, thermal transfer rate along successive elements of the conductive path. Options to optimize the thermal transfer may e.g. comprise increasing a thermal conductivity of the respective elements along the thermal conductive path, minimizing a length (in the direction of the heat flow) of the conductive path in the respective element, increasing a cross section (perpendicular to the direction of the heat flow) of the respective elements, and increasing a (thermal) contact area between the respective elements along the conductive path.

In embodiments, at least the support element comprises a thermally conductive element, for instance a thermally conductive coating (see further below). In further embodiments (also) the reactor wall (also) comprises a thermally conductive element. In further specific embodiments the length along the conductive path in the reactor wall (especially a thickness of the reactor wall) is minimized to reduce the thermal resistance of the reactor wall.

The term "thermally conductive element" may relate to a plurality of (different) thermally conductive elements. Different thermally conductive elements may be comprised by one element (such as the support element). Additionally or alternatively, a plurality of elements (e.g. both the support element and the tubular reactor) may comprise (different) conductive elements.

In further embodiments, the reactor support element (in combination with the reactor) is configured for an optimized (maximized) thermal contact between the support element and the (tubular) reactor. In yet further embodiments, the support element is configured for an optimized (maximized) temperature difference between the fluid, especially the reactor, and the support element. Optimizing the temperature difference may especially relate to minimizing a temperature further downstream in the conductive path, such as the temperature of the support element. The reactor support element, e.g., is in embodiments configured for (passively or actively) cooling (the reactor support element). The thermally conductive element may e.g. comprise (or function as) a heatsink and/or a cooling fluid transport channel (see further below). The term "thermally conductive element" in relation to an object comprising the thermally conductive element may further indicate that the object is (at least partly) thermally conductive and may e.g. (at least partly) be made of a thermally conductive material. For instance in embodiments the reactor support element is made of a thermally conductive material, such as a metal, a (thermally conductive) ceramic material or a (thermally conductive) polymer. Yet, such thermally conductive element may also comprise further thermally conductive elements, such as a heat sink or a fluid transport channel.

Optimizing the thermal contact between the support element and the reactor (fluid) especially relates to maximizing/increasing a (thermal) contact area between the support element and the reactor (or fluid).

Especially, the term "thermal contact" indicates that an element can exchange thermal energy through the process of heat transfer with another element. Especially, herein embodiments are described wherein an element may have thermal contact with a fluid in a duct. In embodiments, thermal contact can be achieved by physical contact. In embodiments, thermal contact may be achieved via a thermally conductive material, such as a thermally conductive glue (or thermally conductive adhesive). Thermal contact may also be achieved between two elements when the two elements are arranged relative to each other at a distance of equal to or less than about 10 μm, though larger distances, such as up to 100 μm may be possible. The shorter the distance, the better the thermal contact. Especially, the distance is 10 μm or less, such as 5 μm or less. The distance may be the distance between two respective surfaces of the respective elements. The distance may be an average distance. For instance, the two elements may be in physical contact at one or more, such as a plurality of positions, but at one or more, especially a plurality of other positions, the elements are not in physical contact. For instance, this may be the case when one or both elements have a rough surface. Hence, in embodiments an average distance between the two elements may be 10 μm or less (though larger average distances may be possible, such as up to 100 μm). In embodiments, the two surfaces of the two elements may be kept at a distance with one or more distance holders.

Herein, the term "thermal contact" may especially refer to an arrangement of elements that may provide a thermal conductivity of at least about 10 W/m/K, such as at least 20 W/m/K, such as at least 50 W/m/K. In embodiments, the term "thermal contact" may especially refer to an arrangement of elements that may provide a thermal conductivity of at least about 150 W/m/K, such as at least 170 W/m/K, especially at least 200 W/m/K. In embodiments, the term "thermal contact" may especially refer to an arrangement of elements that may provide a thermal conductivity of at least about 250 W/m/K, such as at least 300 W/m/K, especially at least 400 W/m/K. For instance, a metal support for a light source, wherein the metal support is in physical contact with the light source and in physical contact with a channel wall of a fluid transport channel, wherein the light source is not in the fluid transport channel, may provide a thermal conductivity between the light source and the fluid transport channel of at least about 10 W/m/K. Suitable thermally conductive materials, that may be used to provide the thermal contact, may be selected from the group (of thermally conductive materials) consist of copper, aluminum, silver, gold, silicon carbide, aluminum nitride, boron nitride, aluminum silicon carbide, beryllium oxide, a silicon carbide composite, aluminum silicon carbide, an copper tungsten alloy, a copper molybdenum carbide, carbon, diamond, and graphite. Alternatively, or additionally, the thermally conductive material may comprise or consist of a ceramic material, such aluminum oxide of a garnet of the YAG-type family, such as YAG. Especially, the thermally conductive material may comprise e.g. copper or aluminum.

In further embodiments, the thermal contact may be provided by an arrangement comprising several types of materials, for instance in a stacked configuration. For example, in embodiments, the arrangement may comprise a stack of functional layers containing both thermal and optical layers. The optical layers may, for example, comprise one or more of BN, Alumina, Di-Chroic layers, reflective polymers, and $TiO_2$ (in a matrix) and (micro porous) polytetrafluoroethylene (PTFE).

The term "heat transfer" is also known as "heat transport". The terms "transport" and "transfer" in relation to heat may be used interchangeably, herein.

Especially, a support element surface of the support element is configured in contact with the tubular reactor. Optimizing the contact area (between the tube and the reactor support element) may in embodiments relate to configuring the support element surface and/or the tubular reactor (tube) such that the contact area between the tube, especially a wall of the tube (the "tube wall"), and the support element surface is increased (maximized). The support element surface is in embodiments configured to match (or correspond with) the (outer surface of) the tube wall. The support element surface may in embodiments comprise a cavity. In embodiments comprising a round tube (having a circular cross section), the support element surface may, e.g. comprise the cavity, such as a groove or a depression having a circular shape matching the tube wall. The cavity may especially define (at least part of) the track. Heat may be transferred away from the reactor via the track.

The cavity may define at least a part of a circle, allowing the tube to be (removably) arranged in the cavity. A radius of the circular shape of the cavity may equal a radius of the tube wall. The support element may further (also) be configured to maximize a surface area of the tube wall for receiving the light source radiation. The cavity may in further embodiments define a part, especially equal to or less than 180° of the circle (circular shape). In a specific embodiment, the cavity defines at least a part of a circle, wherein the part of the circle equals to 180° of the circle. The obtained effect is good thermal management i.e. cooling and good radiation of the (tubular) reactor (e.g. tube). In alternative embodiments, the tube may comprise a rectangular, such as square, cross section, and the cavity or groove may e.g. comprise a triangular shape or a rectangular shape (for hosting the tube). A track surface of the track, especially a cavity surface of the cavity, may e.g. comprise a plurality of flat faces configured for contacting flat parts of the surface of the tube wall (e.g. of the tube comprising a rectangular cross section or a tube comprising a polygonal cross section). The shape of the cavity (surface), especially of the track, is especially configured complementary to the cross section of the tube.

Further, the support element may comprise a support element face. A surface of the support element ("support element surface") may especially comprise the support element face. The cavity is especially configured depressed with respect to the support element face. Moreover, in specific embodiments (e.g. wherein the reactor comprises a circular tube), at least half of (a volume of) the tube may protrude from the support element face. Hence, the cavity may especially be configured to host equal to or less than 50% of the tube (relative to the cross section of the tube) (wherein the remainder protrudes from the cavity). For instance in embodiments, 10-50% of the outer surface of the reactor wall may contact the surface of the track. Yet, in further embodiments (such as wherein the tube comprises a rectangular cross section or wherein a tubular structure defines the track (see below), the track and/or the cavity may be configured to host substantially the entire tube. In embodiments, e.g. only one face of the tube is configured in radiation receiving relationship with the plurality of light sources. As such e.g. up to 75% of the outer surface of the reactor wall (such as for a rectangular tube having four faces) may contact the surface of the track.

Herein, the term "cavity" may especially relate to (at least part of) a groove or a depression or an open channel. The cavity is especially elongated. The term may in embodiments relate to a single cavity. The term may (also) relate to a plurality of (different) cavities. The term "reactor wall" may especially refer to the tube wall.

Hence, in embodiments, the reactor support element comprises a support element surface comprising a cavity, wherein the cavity defines the track. In embodiments, a surface of the track is especially configured to correspond to (at least part of) an outer surface of the reactor wall. The surface of the track may match (part of) the outer surface of the reactor wall. The surface of the track may be configured such that at least part of the reactor fits in the track (and contacts the track). The enclosing configuration is in embodiments based on a cavity provided in the support element. The configuration (shape) of the track especially corresponds to the configuration (shape) of the reactor. In further embodiments at least 20%, such as at least 40%, of the reactor wall is in (physical) contact with the surface of the track. In further embodiments, 20-75%, such as 20-50%, of the reactor wall is in (physical) contact with the surface of the track.

In further embodiments, the surface of the track may comprise a reflective element, especially being reflective for the light source radiation. The reflective element may reflect light source radiation passing through the reactor. The thermally conductive element, especially the track, may especially comprise the reflective element. The support element surface and/or the track is especially configured to match the tube, especially the arrangement of the tube. For instance, in embodiments, the tube may be helically coiled. In such embodiments, (also) the track may be helically coiled.

The term "reflective element" especially relates to an element being able to reflect the light source radiation. Especially at least 50% of light source radiation may be reflected when provided to the reflective element. The reflective element may e.g. comprise a (reflective) coating, or a reflective surface. In embodiments, the object comprising the reflective element may (at least partly) be made of reflective material. For instance, the object may be made of a reflective metal, or another (non-metal type) material that may reflect the light source radiation. In specific embodiments, one or more of the thermally conductive elements is made of thermally conductive material that also is reflective for the light source radiation.

The reactor support element may in further embodiments comprise a thermally conductive element, such as a thermally conductive coating. The thermally conductive element is especially (directly or indirectly via a conductive path) configured in thermal contact with the tubular reactor. The track may comprise the thermally conductive element. In further embodiments at least part of the reactor support element is made of a thermally conductive material. In specific embodiments, substantially the entire support element is made of metal. The metal may e.g. be aluminum (or "aluminium"). Aluminum may e.g. easily be processed by e.g. by die-casting or die pressing to provide the support element, especially comprising the cavity (see further below). Yet in further embodiments, the metal may be a further metal described herein in relation to conductive materials. Furthermore, the support element may comprise or be made of any further conductive material described herein. In further embodiments, the reactor support element comprises a support body. In embodiments, the reactor support body, at least partly, comprises (or is made of) thermally conductive material. In embodiments, at least part of the reactor support element is produced from a metal, especially from aluminum. Yet in further embodiments, at least a part of the reactor support element is produced from a thermally conductive ceramic material, such as described herein. The support element may further also comprise an optical layer. At least part of the reactor support element may further e.g. comprise one or more of boron nitride (BN), alumina ($Al_2O_3$), aluminum, di-chroic layers, a reflective polymer, and titanium dioxide ($TiO_2$). The optical layer may comprise a silver comprising layer (or "silver reflector"), or a dichroic layer. The layer may comprise (micro porous) polytetrafluoroethylene (PTFE). In embodiments, at least part of the reactor support element comprises one or more of aluminum, boron nitride, alumina, silver, a di-chroic layer, and (micro porous) PTFE. Especially the reflective element comprises the optical layer and/or one or more of the compounds described in relation to the optical layer.

The reactor support element, especially the support body, may in embodiments be substantially solid and may for instance comprise a heat sink. The heat sink being an embodiment of the thermally conductive element. Additionally, or alternatively, the reactor support element, especially the support body, may be a (hollow) body comprising one or more (cooling) fluid transport channels (or cooling fluid cavities). The support body (support element) may comprise a support body axis (support element axis). The support body axis (and the support element axis) is especially configured parallel to an elongated axis of the (coiled) tubular arrangement ("(tubular) arrangement axis"). The one or more (cooling) fluid transport channels are in embodiments configured parallel to the support body/element axis. The one or more fluid transport channels (in the support body) may in embodiments extend from a first end of the support body to an opposite end of the support body (along the support body axis). Such channel may provide an open fluid connection from a first end of the support body or element to another end of the support body/element. In further embodiments, extremes of the one or more fluid transport channels may be configured at the same end or side of the support body/element. Additionally or alternatively, the support element, especially the support body, may comprise a cooling (fluid) cavity e.g. for hosting a cooling fluid (or also: "a temperature control fluid"). Such cavity may have only one opening and is especially no flow through cavity.

The term "(cooling) fluid transport channel" especially relates to a channel/path configured in the reactor assembly which may hold a (cooling) fluid, especially through which a fluid may flow (such as by a forced transport or spontaneously). The term "(cooling) fluid transport channel" may in embodiments refer to a plurality of (different) (cooling) fluid transport channels. The cooling fluid may be a gaseous cooling fluid, such as air. The cooling fluid may also be a (cooling) liquid. The cooling fluid may be further be known as "a coolant". The cooling fluid may be water. The cooling fluid transport channel is especially configured in functional contact (especially in thermal contact) with the reactor, especially with the fluid. The cooling fluid may be configured for cooling the fluid, especially the reactor. Especially, the cooling fluid is in fluid contact with the support element. Also the term "(cooling) fluid channel" may be used referring to the (cooling) fluid transport channel.

The support element is especially configured for transferring the heat form the tube to the support element. In embodiments the heat may be dissipated in the support element, especially in the thermally conductive element comprised by the support element. Additionally or alternatively, the heat may be transferred to a cooling fluid configured in functional (especially thermal) contact with the support element, especially with the thermally conductive element (of the support element). In embodiments the thermally conductive element is configured for receiving the cooling fluid.

The terms "reactor support element" and "support body" may relate to a plurality of (different) reactor support elements and a plurality of (different) support bodies, respectively. The term support body may further relate to a plurality of (different) support elements together defining the support body. For instance, a plurality of support pillars may define the support body. In specific further embodiments, the support element, especially the support body has a rotational symmetry. The support body/support element may, e.g., comprise a cylindrical shape or a polygonal shape (or cross section) (in a planar projection) (see also below).

The reactor support element may comprise a cylindrical support body. Such cylinder may allow easy winding of the tube around the support element or inside and against the support element. In further embodiments, the support body comprises an elongated body (with a support body axis). The tubular reactor may especially be coiled around the elongated body. The elongated body may in embodiments define a polygonal shape (support body) (in a planar view), especially having rounded corners. In further embodiments, the tube is configured loosely around the corners to avoid deformation and/or breaking of the tube. The support element, especially the support body, may in embodiments define the (coiled) tubular arrangement.

The term "thermally conductive element" may relate to any element that may conduct heat. The thermally conductive element especially comprises or is made of thermally conductive material. The thermally conductive material may comprise one or more of the thermally conductive materials described above. The thermally conductive material may in specific embodiments comprise a ceramic material. The thermally conductive element may e.g. comprise a (thermally conductive) ceramic material, e.g. selected from the group of aluminum nitride (AlN), alumina $Al_2O_3$, silicon carbide (SiC), silicon nitride ($Si_3N_4$), magnesium oxide (MgO), boron nitride (BN) and beryllium oxide (BeO). The thermally conductive element may in embodiments comprise a layer or a coating arranged configured at, or being part of, the element comprising the thermally conductive element. In further embodiments, the element comprising the thermally conductive element may be configured thermally conductive, and especially may at least partly be made of the thermally conductive material.

In further embodiments, the element comprising the thermally conductive element may function as a heat sink or heat spreader. In yet further embodiments, the thermally conductive element comprises a (dedicated) heatsink, e.g., comprising fins or other elements to increase a contact area between the heatsink and a cooling medium. The thermally conductive element may facilitate a transport of heat generated in the reactor assembly from relatively warmer to relatively cooler locations, and especially to a location external from the reactor assembly.

As described above, the tube may comprise a (inner) circular cross section. Yet, the tube may in further embodiments comprise a rectangular cross section or, for instance, a hexagonal cross section and/or a polygonal cross section. Especially, the tube wall encloses a tube space. In embodiments, the outer side of the tube wall may be configured in contact with the reactor support. The tube wall may especially define a wall of the reactor ("reactor wall"). The reactor wall may define a reactor volume.

Yet in further specific embodiments, the reactor support element may be configured inside the tube, especially wherein the inside of the tube wall is arranged facing the reactor support element (over the radius of the tube). In further embodiment a tube may be arranged within the reactor support element, especially wherein the outside of the tube wall is arranged facing the reactor support element (over the radius of the tube). The tube may be configured for hosting the fluid between the tube wall and the support element (surface). The reactor support element and the tube wall may together define a volume for hosting the fluid, especially the reactor volume. In specific embodiments, the tube wall and the reactor support element together define (at least part of) the tubular reactor. The support element may define a first reactor wall, and the tube wall may define a second reactor wall. In such embodiment the second reactor wall is especially configured transmissive for the light source radiation. In embodiments, the first reactor wall may be configured reflective for the light source radiation (see below). In such embodiments, the thermal resistance between the fluid and the reactor support element is especially (further) minimized. In such embodiments, the reactor support element surface and the tube wall may especially be configured similar and coaxially with respect to each other. The support element and the tube wall may define an annulus. The tube (wall) and the reactor support element (surface) may in embodiments (both) be cylindrical. The first reactor wall is in embodiments configured closer to the tubular arrangement axis than the second reactor axis. Yet, in other embodiment, the second reactor wall is closer to the tubular arrangement axis than the first reactor wall. Hence, in embodiments the support element may enclose the second reactor wall. In further embodiments, the second reactor wall may enclose the support element. The reactor may thus (also) be define at the outer side of the tube wall.

In further embodiments, the tube arrangement (the tube wall) and the reactor support element both define a polygon. The tubular arrangement of embodiments wherein the reactor support element defines the first reactor wall and the tube wall defines the second reactor wall may define a straight tubular arrangement (see also below).

The term "reactor" especially relates to a (photo)chemical reactor. The term essentially relates to an enclosed (reactor) volume in which the (photochemical) reaction may take place. The reactor comprises a reactor wall especially enclosing the (enclosed) (reactor) volume. The reactor especially comprises a tubular reactor. The tubular reactor may comprise one or more tubes or pipes. The tube may comprise many different types of shapes and dimensions. The term "(reactor) wall" may relate to a plurality of (different) reactor walls. The term may e.g. refer to the first (inner) reactor wall and the second (outer) reactor wall described above. The term may further refer to tube walls of a plurality of tubes (together defining the tubular reactor).

The term "similar" in relations to shapes of an element especially means geometrically similar, i.e. one of the shapes may be identical to the other shape after a resize, flip, slide or turn. Similar shapes may be conformal.

The term "annulus" may relate to a circular annulus as well as to a polygonal, such as a square, annulus (or any other geometry of a cross sectional area defined between the first (inner) and the second (outer) reactor wall).

The term "a tube" especially refers to "a pipe", "a channel", "an elongated (open) vessel", "tubing", "piping", etc. that may hold the fluid, and especially in which the fluid may be transported. Hence, also terms like "tubing", "pipe", "piping", "channel", etc. may be used to refer to the tube. Further, the term "tube" may in embodiments refer to a plurality of tubes.

The tube may especially be elongated. A length of the tube may especially be larger than an (inner) width of the tube. A ratio of the length of the tube to the (inner) width of the tube may in embodiments be larger than 5, especially larger than 10. The tube may comprise an (elongated) tube axis.

The tube is (at least partly) transmissive for the light source radiation and especially the radiation provided to the tube may pass the tube wall unhampered. In embodiments, the tube is made of glass. The tube may e.g. be made of quartz, borosilicate glass, soda-lime(-silica), high-silica high temperature glass, aluminosilicate glass, or soda-barium soft glass (or sodium barium glass) (PH160 glass). The glass may, e.g. marketed as Vycor, Corex, or Pyrex. The tube is in embodiments (at least partly) made of amorphous silica, for instance known as fused silica, fused quartz, quartz glass, or quartz. The tube may in further embodiments at least partly be made of a (transmissive) polymer. Suitable polymers are e.g. poly(methyl methacrylate) (PMMA), silicone/polysiloxane, polydimethylsiloxane (PDMS), perfluoroalkoxy alkanes (PFA), and fluorinated ethylene propylene (FEP). The tube may further comprise a transmissive ceramic material. Examples of transmissive ceramics are e.g. alumina $Al_2O_3$, yttria alumina garnet (YAG), and spinel, such as magnesium aluminate spinel ($MgAl_2O_4$) and aluminum oxynitride spinel ($Al_{23}O_{27}N_5$). In embodiment, e.g. the tube is (at least partly) made of one of these ceramics. In yet further embodiments, the tube may comprise (be made of) transmissive materials such as $BaF_2$, $CaF_2$ and $MgF_2$. The material of the tube may further be selected based on the fluid to be treated. The material may especially be selected for being inert for the (compounds in) the fluid.

Preferably, the radiation provided to the tube may penetrate substantially all fluid in the tube and the tube may especially have an inner characteristic size, such as a diameter or an inner width or height smaller than 10 mm, especially smaller than 8 mm, such as smaller than 5 mm. The characteristic size may in embodiments be at least 0.1 mm, such as 0.2 mm, especially at least 0.5 mm. Hence, in embodiments, the tube comprises an inner cross-sectional area selected from the range of 0.01-80 $mm^2$, especially from the range of 0.45-2 $mm^2$. In embodiments, the term "width" (of the tube) may relate to a characteristic (inner) distance (or size) between two opposite sides of the wall of the tube. The term "width" may in embodiments relate to the effective (or flow through) width of the tube (for hosting the fluid), especially the width of the tubular reactor defined by the tube wall. In embodiments wherein the reactor support element defines one reactor wall and the tube defines another reactor wall, the term "width (of the tube)" may (also) refer to a (shortest) distance between the tube wall and the reactor support element. Yet, in further embodiments, the term may relate to an (inner) width or an (inner) height of the tube (especially a (longest) distance between two opposite positions at the wall of the tube, especially along a line perpendicular to the tube axis). The term may e.g. refer to an inner diameter of the tube (for a circular cross sections).

The tube may in further embodiments be configured for providing a low thermal resistance between the fluid and external of the tube. The tube may in embodiments comprise (or is made of) a thermally conductive material, such one or more of the thermally conductive materials described herein. In further embodiments a width of the tube wall is minimized. In embodiments, e.g., the width of the tube wall is less than 1 mm, such as less than 0.7 mm, e.g. in the range of 0.1-0.7 mm. Especially a ratio of the width of the tube wall to the inner characteristic size of the tube is selected in the range from 0.05-0.25.

Further, the tube (tubular reactor) especially comprises an inlet opening and an outlet opening, arranged at extremes of the tube (and defining the length of the tube/tubular reactor). A fluid flow provided at the inlet opening may especially exit the tube at the outlet opening. During operations a fluid may flow from the inlet opening to the outlet opening in "a flow direction" or "a direction of flow". The tube axis is especially (locally) configured parallel to the flow direction. Further, the tube especially does not comprise fluid flow restrictions in the tube. The tube is in embodiments configured for allowing a constant fluid velocity along the length of the tube. The tube may in embodiments comprise a (substantially) constant inner cross sectional area (or flow through cross sectional area).

In specific embodiments, the tubular reactor comprises a plurality of tubes. Hence, the tubular arrangement may in embodiments comprise or be defined by a plurality of tubes. In embodiments, a tubular arrangement axis is especially configured parallel to the tube axis (such as of one or of the plurality of tubes). In further embodiments, the tubular arrangement may especially have a rotational symmetry (especially around the tubular arrangement axis). The tubular arrangement may in embodiments define a circle or e.g. an ellipse. In further embodiments, the tubular arrangement may define a polygon.

In specific further embodiments, for instance wherein the tube space encloses the support element as described above, the tube may be configured to define one or more of the polygon or a circle (or an ellipse) described above. The tube may in specific embodiments comprise a plurality of (rectangular) panels, wall elements, or wall sections defining the tube wall. For instance, in embodiments, the tube (defining the second reactor wall) comprises four panels/wall elements, and especially (also) the reactor support element comprises four panels, wall elements, or wall sections (together defining the first reactor wall). These wall elements/panels/sections may be arranged to provide a rectangular (square) tubular reactor especially having a rectangular (square) annulus between the first and second reactor wall. Together, these (eight) wall elements/panels/sections may therefore define the tubular reactor, wherein the tubular arrangement defines a rectangle (square) (as an embodiment of a polygon). It will be understood that tubes having other (polygonal) shapes (especially in combination with (polygon shaped) reactor support element) may be configured likewise. In further embodiments, both the reactor support element and the tube are cylindrically shaped.

In further embodiments, a plurality of (parallel arranged) tubes together define the tubular reactor. In such configuration, the tubular arrangement may (also) especially comprise a straight tubular arrangement. The plurality of tubes may especially (all) be arranged in a plurality of (especially straight) cavities. The cavities may especially comprise straight cavities. In further embodiments, the track may especially comprise a plurality of straight tracks, especially configured for partly enclosing the (tubes of the) tubular reactor (configured in a straight tubular arrangement).

In the latter embodiments (with the plurality of especially parallel arranged, tubes), as well as in embodiments wherein the tube wall in combination with the reactor support element define the tubular reactor, the tubular arrangement axis may especially be configured parallel to the tube axis (of the tube or the plurality of tubes).

The term "track" may in embodiments relate to a plurality of tracks. Such plurality of tracks may in embodiments comprise different tracks (for different tubes).

In further embodiments, (especially comprising a plurality of tubes) the tubes may be arranged transverse with respect to the tubular arrangement axis. The tubes may partly curve around the tubular arrangement axis. Especially, (overall) a component of the tube axis (that is) arranged parallel to the tubular arrangement axis is larger than a component of the tube axis (that is) arranged perpendicular to the tubular arrangement. Also such arrangement may be comprised by the straight tubular arrangement (in contrast to a coiled tubular arrangement).

Hence, in embodiments, the tubular arrangement axis may be arranged parallel to the tube axis. The tubular arrangement may be configured in a straight tubular arrangement. In embodiments, the tubular arrangement comprises a straight tubular arrangement, especially wherein a first component of the tube axis (that is) configured parallel to the tubular arrangement axis is larger than a second component of the tube axis (that is) configured perpendicular to the tubular arrangement.

In further embodiments, the tube may be bent, curved, or e.g. folded. Moreover, a direction of the (elongated) tube axis may change along a length of the tube. The flow direction along the tube may change correspondingly. The tube may e.g. be coiled. Such bends, curves, or folds may especially be configured to (locally) (substantially) not obstruct a possible fluid flow through the tube.

The tubular reactor may be spiraled. The tube may have a shape like a corkscrew. In further embodiments, the shape of the tubular reactor corresponds to a circular helix (having a constant radius with respect to the tubular arrangement axis). The tube may especially be coiled. The coiled tube may comprise a single turn or winding. The coil may in embodiments comprise less than a single turn. Yet, the coiled tube especially comprises a plurality of turns, windings.

The tube may e.g. comprise at least 10 windings or turns, especially at least 20 windings, such as at least 50 windings. In embodiments, the tube comprises 2-200, especially 5-100, even more especially 10-75 windings or turns. In yet further embodiments the tube may comprise more than 200 windings, such as up to 500, or even up to 1000, or even more. The windings or turns are especially (all) configured aligned with each other. As such, the coil or spiral may comprise a monolayer of windings or turns (especially with respect to the tubular arrangement axis). The windings or turns may in further embodiments define a face of the (coiled) tubular reactor (or the tubular arrangement. In further embodiments the windings or turns may define two opposite faces of the tubular reactor. The faces are especially configured in a radiation receiving relationship with the light sources.

It will be understood that intermediate configurations between substantially straight tubes and coiled tubes are also part of this invention. In embodiments, e.g., the tubular reactor comprises a (plurality of) coiled tube(s) comprising less than one turn, such as half of a turn or only a quarter of a turn. Such configurations may be comprised by the coiled tubular arrangement and/or the straight tubular arrangement.

In further specific embodiments, a distance between successive windings or turns of the spiral (coil) may be minimized. In embodiments, successive windings (turns) of the coil may be arranged contacting each other substantially along a complete winding (turn). The pitch of the spiral or coil may in embodiments substantially equal a characteristic outer size of the tube. In further embodiments, the pitch may be equal to or less than 10 times the outer size of the tube, such as equal to or less than 5 times the outer size of the tube. The pitch may in embodiment e.g. be substantially 2 times the characteristic outer size (especially leaving space for a further, especially parallel arranged, tube).

Yet, the pitch may in embodiments be larger than 10, such as 50 or 100 times the characteristic outer size. The term "pitch" is known to the person skilled in the art and especially refers to a shortest distance between centers (tube axes) of two adjacent windings or turns. The term may further relate to a distance between centers of two adjacently arranged parts of the track.

The distance between aligned tube parts may especially be defined by the track. Especially, the pitch of the track may comprise values such as describe with respect to the pitch in relation to the tube.

The term "characteristic outer size" especially relates to a largest distance from a first location of the tube (reactor) wall to a second location of the tube (reactor) along a line perpendicular to the tube axis. For a circular tube, the outer size equals the outer diameter. For a square or rectangular tube, the outer size may refer to the outer height or outer width of the tube.

Hence, in embodiments, the tubular arrangement comprises a coiled tubular arrangement, especially wherein the tubular reactor is helically coiled. In further embodiments (also) the track is helically coiled.

In further embodiments, the tubular arrangement comprises a straight tubular arrangement, especially wherein the tubular reactor comprises a plurality of straight tubes. In yet further embodiments, (also) the track comprises a plurality of, especially straight, tracks.

The track may especially be defined by the cavity of the support element surface (see above). Additionally or alternatively, (at least part of) the track may (also) be defined by a further structure provided at the support element. Such further structure may comprise a thermally conductive element or may e.g. be configured thermally conductive. The further structure is especially configured for transferring heat away from the reactor, especially the fluid, to external of the reactor assembly, or e.g. to the support element. The further structure may be configured for enclosing at least part of the tubular reactor. The further structure may especially be configured to define a track that matches (or corresponds with) the (outer surface of) the tube wall. The further structure may comprise an element, especially comprising a thermally conductive element, arranged at the support element surface, especially at a flat support element surface. Such element may comprise the cavity described above in relation with the surface of the support element. The further structure may especially be configured in thermal contact with the reactor support element. The further structure may further especially be configured in (thermal) contact with the tubular reactor.

In specific embodiments, the further structure comprises a tubular structure, and especially the tubular structure is arranged at the support element (surface). Hence, the reactor support element may in embodiments comprise the further structure, especially the tubular structure. The further structure, especially the tubular structure may partly enclose the tubular reactor. The tubular structure may in embodiments comprise the thermally conductive element. The tubular structure may e.g. comprise a thermally conductive coating for transporting heat. The tubular structure may in embodiments comprise a solid tubular structure, especially made of a thermally conductive material (such as described herein). In alternative embodiments, the tubular structure comprises a cooling fluid transport channel. The tubular structure may especially be configured adjacent to, and especially in contact with, the (wall of) tubular reactor. The tubular structure may in embodiments comprise tubing configured to host a cooling fluid during operation. Hence, the tubing may comprise the cooling fluid transport channel. The tubular structure, especially the tubing, especially comprises the thermally conductive element. In specific embodiments, the tubing (further) comprises a thermally conductive wall.

Hence, in embodiments, the reactor support element (further) comprises a tubular structure, wherein the tubular structure defines (at least part of) the track, wherein the tubular structure partly encloses the tubular reactor.

An arrangement of the tubular structure, especially of the tubing may be selected to match the tubular arrangement (of the tubular reactor). The tubular structure is in embodiments configured as a straight tubular (structure) arrangement. In further embodiments, the tubular structure arrangement is configured as a helically coiled (tubular structure) arrangement. Especially, the tubing is helically coiled. In embodiments, the tubular structure, especially the tubing, is configured contacting the support element and defining the track, wherein the track extends (protrudes) from the reactor support element. The tubular reactor may especially be configured stacked on the tubular structure. The tubular reactor may in embodiments enclose the tubular structure. The tube of the reactor may be arranged in the track. The tubular structure may in embodiments define the track with a pitch substantially equal to the pitch of the tubular reactor. In embodiments, the pitch of the track is substantially equal to the characteristic outer size of the tube of the reactor. In further embodiments, a characteristic outer size of the tubular structure, especially of the tubing, substantially equals the outer size of the tube (of the reactor).

The tubular structure may in further embodiments be configured sandwiching the tubular reactor. The tubular structure may enclose the tube wall along the length of the tube for at least 40%, such as in the range of 50-75%. In embodiments the tubular reactor is coiled around (or inside) the support element and the tubular structure (tubing) is coiled around (or inside) the support element. Further, the pitch of the tube of the tubular reactor may be configured to be twice the outer size of the tube, and especially the pitch of the track defined by the tubular structure (tubing) is selected to equal the pitch of the tube of the tubular reactor. As such, windings of the tube and windings of tubular structure (tubing) may be alternatingly arranged coiling around the tubular arrangement axis along the length of the tube, and especially each two windings of the tubular structure(tubing) may sandwich a tube winding (and vice versa). It will be understood that other configurations are also possible. For instance, arrangements wherein alternately two windings of the tube and one winding of the tubing (tubular structure) are arranged. Also in such configuration, two tubing windings (windings of the tubular structure) sandwich (the two windings of) the tubular reactor.

Furthermore, also these configurations may be combined. In embodiments, e.g. a first part of the tubing or tubular structure is configured contacting the support element and defining (a first part of) the track at a location extending from the reactor support element, and a second part of the tubing or tubular structure is stacked on top of the first part, together with the tube, wherein windings of the tubing (tubular structure) may sandwich windings of the tube. Hence, in embodiments, the tubular structure may be arranged between the support element and the tubular reactor. Additionally or alternatively, the tubular structure embeds the tubular reactor. Especially, the tubing is configured partly embedding, especially sandwiching the tubular reactor. The tube may be arranged in a depression defined by adjacently arranged parts (such as windings) of the tubing.

Hence, in further specific embodiments, the tubing is configured in thermal contact with the tubular reactor, and the tubing and the tubular reactor are configured in a sandwich arrangement with the tubing sandwiching the tubular reactor.

The tubular structure, especially the tubing, may further comprise a reflective element, especially being reflective for the light source radiation. The tubular structure may in embodiments comprise a reflective coating and/or a reflective surface. In embodiments, the thermally conductive element comprises the reflective element.

In further specific embodiments, one or more of the track, the surface of the track, and the tubing comprises a reflective element, wherein the reflective element is reflective for light source radiation, and especially wherein the thermally conductive element comprises the reflective element.

The term "tubing" may refer to a plurality of different types of tubing. Different types of tubing may e.g. have a different dimensions (such a different (outer) diameter), a different wall, or a different coating.

The reactor assembly may be used for treating a fluid. As a result, (photosensitive) reactants in the fluid may react (see also below). Moreover, the term "treating the fluid with light source radiation" may in embodiments relate to executing a (photochemical) reaction on (reactants in) the fluid.

Herein also the term "irradiating the fluid" such as in the phrase "irradiating the fluid, with the light source radiation" is used. The term may especially relate to providing light source radiation to the fluid. Hence, herein the terms "providing light source radiation (to the fluid)" and the like and "irradiating (the fluid with) light source radiation" may especially be used interchangeably. Moreover, herein the terms "light" and "radiation" may be used interchangeably, especially in relation to the light source radiation.

In specific embodiments, the reactor assembly (further) comprises the (plurality of) light sources configured to generate the light source radiation. The plurality of light sources may be configured for radiating (emitting) one or more of UV radiation, visible radiation, and IR radiation. The reactor assembly may especially comprise a light source arrangement comprising the plurality of light sources. The plurality of light sources may be configured in the light source arrangement. The reactor assembly may in embodiments (thus) comprise a photoreactor assembly.

The term "UV radiation" is known to the person skilled in the art and relates to "ultraviolet radiation", or "ultraviolet emission", or "ultraviolet light", especially having one or more wavelengths in the range of about 10-400 nm, or 10-380 nm. In embodiments, UV radiation may especially have one or more wavelength in the range of about 100-400 nm, or 100-380 nm. Moreover, the term "UV radiation" and similar terms may also refer to one or more of UVA, UVB, and UVC radiation. UVA radiation may especially refer to having one or more wavelength in the range of about 315-400 nm. UVB radiation may especially refer to having one or more wavelength in the range of about 280-315 nm. UVC radiation may further especially have one or more wavelength in the range of about 100-280 nm.

The terms "visible", "visible light", "visible emission", or "visible radiation" and similar terms refer to light having one or more wavelengths in the range of about 380-780 nm.

The term "IR radiation" especially relates to "infrared radiation", "infrared emission", or "infrared light", especially having one or more wavelengths in the range of 780 nm to 1 mm. Moreover, the term "IR radiation" and similar terms may also refer to one or more of NIR, SWIR, MWIR, LWIR, FIR radiation. NIR may especially relate to Near-Infrared radiation having one or more wavelength in the range of about 750-1400 nm. SWIR may especially relate to Short-wavelength infrared having one or more wavelength in the range of about 1400-3000 nm. MWIR may especially relate to Mid-wavelength infrared having one or more wavelength in the range of about 3000-8000 nm. LWIR may especially relate to Long-wavelength infrared having one or more wavelength in the range of about 8-15 μm. FIR may especially relate to Far infrared having one or more wavelength in the range of about 15-1000 μm.

In embodiments (at least part of) the plurality of light sources comprise Light emitting diodes (LEDs), especially an array of Light emitting diodes. The term "array" may especially refer to a plurality of (different) arrays. In further embodiments (at least part of) the plurality of light sources comprise Chips-on-Board light sources (COB). The term "COB" especially refers to LED chips in the form of a semiconductor chip that is neither encased nor connected but directly mounted onto a substrate, such as a Printed Circuit Board. The COB and/or LED may in embodiments comprise a direct LED (with dominant wavelengths ranging for instance from UVC to IR wavelengths) In further embodiments, the COB and/or LED comprises one or more phosphor-converted LEDs. Using such light sources, high intensity radiations (light) may be provided per light source or per light source (support) element (see below). In embodiments, e.g., the light sources may provide 100-25,000 lumen (visible light) per light source. In embodiments, the light sources may e.g. apply (consume) 0.5-500 (electrical) Watts per light source (input power).

In embodiments, the plurality of light sources may comprise (single) chips-on-board light sources (COB) and/or (single) light emitting diodes (LEDs), and/or (single) laser diodes. In further embodiments, the light sources may comprise an array of light emitting diodes (LEDs) and/or laser diode sources.

Hence, in embodiments, the plurality of light sources comprise one or more of chips-on-board light sources (COB), light emitting diodes (LEDs), and laser diodes. In further embodiments, the plurality of light sources comprise Chips-on-Board light sources (COB) and/or an array of Light emitting diodes (LEDs).

Hence, in further embodiments, the reactor assembly comprises a photoreactor assembly, wherein the reactor assembly further comprises a light source arrangement comprising a plurality of light sources configured to generate the light source radiation, especially wherein (at least part of) the reactor wall is configured in a radiation receiving relationship with the plurality of light sources.

The light source arrangement may be configured to efficiently provide light source radiation to the tubular reactor. The light source arrangement may especially have a light arrangement axis, configured parallel to the tubular arrangement axis. The light source arrangement may be configured corresponding to the tubular arrangement. In embodiments, e.g., the tubular arrangement comprises a cylindrical arrangement and the light source arrangement comprises a cylindrical arrangement. The light source arrangement may especially comprise a radial light source arrangement, especially wherein the light sources are arranged along a circle (in a planar projection).

In further embodiments, the tubular arrangement comprises a cylindrical arrangement and the light source arrangement may be defined by a number of, especially rectangular, light source elements supporting the light sources. Especially each light source element comprises one or more of the light sources. The light source elements may be removably configured in the reactor assembly. Such configuration may allow easy assembling of the reactor assembly and may further allow for a quick change of one or more of the light source (e.g. when another radiation wavelength is desired). The combination of the light source elements, and especially the light source arrangement may therefore in embodiments define a polygon (especially in a planar projection). The light sources may be arranged at the polygon edges, especially at the center of the polygon edges. For instance, in embodiments one of the light sources is arranged at a center of each of the polygon edges.

Optical simulations have shown that in embodiments with a hexagonal support element and a hexagonal light source arrangement about 10% extra lights source radiation is received by the fluid compared to a hexagonal light source arrangement providing radiation to a tube arranged at a cylindrical support element. The efficiency may be improved when the tubular arrangement and the light source arrangement are similar. The gain in efficiency is especially observed for polygonal shapes up to eight or ten edges. A polygon having 4-8, even more especially 6 to 8 edges may be especially advantageous in terms of efficiency, manufacturing and operation.

In further specific embodiments, (also) the tubular arrangement may define a polygon (especially in a planar view). In further embodiments, one or more of the tubular arrangement and the light source arrangement defines a polygon. In embodiments, a number of edges of the polygon equals (a total) number of light source elements.

The plurality of light sources may be configured enclosing the tubular arrangement (and as such may all face in a direction of the tubular arrangement axis). In further embodiments, the plurality of light sources are enclosed by the tubular arrangement (and may all face away from the tubular arrangement axis). Yet, in further embodiments, a part of the light sources enclose the tubular arrangement and another part is enclosed by the tubular arrangement. Hence, in embodiments at least a first subset of the plurality of light sources enclose the (coiled) tubular arrangement. Additionally, or alternatively at least a second subset of the plurality of light sources are enclosed by the (coiled) tubular arrangement.

In further embodiments, the light sources are comprised by a plurality of light source elements and especially the light source elements are configured for moving/guiding heat away from the light sources. The light source element may in embodiments comprise one or more thermally conductive element configured in thermal contact with at least one of the light sources comprised by the light source elements.

Hence, in embodiments, the photoreactor assembly comprises a number of light source elements wherein each light source element comprises one or more of the plurality of light sources, and especially wherein each of the light source elements comprises at least one thermally conductive element configured in thermal contact with the light source(s) (comprised by the light source elements). The thermally conductive element may especially at least partly comprise (or be made of) a thermally conductive material, such as described herein. In further embodiments, the light source element is a thermally conductive element.

The light source element may further comprises a reflective element at a surface of the light source element facing (in a direction of the) the reactor wall. The reflective element is especially reflective for the light source radiation. The reflective element may comprise a (reflective) coating. In further embodiments, the surface of the light source element is reflective. The (surface) of the reflective element may e.g. comprise a metal being reflective for the light source radiation. In embodiments the thermally conductive element comprises the reflective element. In further embodiment, the surface of the thermally conductive element may be reflective.

Additionally, or alternatively the reactor assembly may further comprise a wall enclosing the tubular reactor and especially also the light source elements. Also such wall may comprise a reflective element, such as described herein e.g. in relation to the light source element. The wall may e.g. comprise a reflective coating and/or a reflective surface facing the tubular reactor, wherein the reflective surface is reflective for the light source radiation.

As described above, many photochemical reactions are known, such as dissociation reactions, isomerization or rearrangement reactions, addition reactions and substitution reactions, and, e.g., redox reactions. In embodiments, the (photochemical) reaction comprises a photocatalytic reaction. Photochemical reactions may especially use the energy of the light source radiation to change a quantum state of a system (an atom or a molecule) (that absorbs the energy) to an excited state. In the excited state, the system may successively further react with itself or other systems (atoms, molecules) and/or may initiate a further reaction. In specific embodiments, a rate of the photochemical reaction may be controlled by an added (photo-)catalysts or photo-sensitizer. The terms "treating", "treated" and the like, used herein, such as in the phrase "treating a fluid with the light source (light)" may especially thus relate to performing a photochemical reaction on a relevant (especially photosensitive) system (atom or molecule) in the fluid, especially thereby elevating the system (atom, molecule) to a state of higher energy and especially causing the further reaction. In embodiments a photoactive compound may be provided to the fluid prior and/or during the irradiation of the fluid. For instance, a photocatalyst and/or a photosensitizer may be added to start and/or promote/accelerate the photochemical reaction. Herein, such atom or molecule may further also be named "a (photosensitive) reactant".

When absorbing (light source) radiation (light), energy of a photon may be absorbed. The photon energy may also be indicated as hv, wherein h is Planck's constant and v is the photon's frequency. Hence, the amount of energy provided to the atom or molecule may be provided in discrete amounts and is especially a function of the frequency of the light (photon). Furthermore, the excitation of an atom or a molecule to a higher state may also require a specific amount of energy, which preferably is matched with the amount of energy provided by the photon. This may also explain that different photochemical reactions may require light having different wavelength. Therefore, in embodiments, the assembly may be configured to control a wavelength of the light source radiation.

In embodiments, the plurality of light sources are configured to provide a determined wavelength (distribution) (during operations). In further embodiments one or more of the light sources may provide (a) mutually different wavelength (distributions). In further embodiments, (also) the intensities of the light source radiation of the light sources may be controlled independently from each other.

In specific embodiments, two or more of the plurality of light sources may provide light source radiation having different spectral power distributions. For instance, a first light source may be configured to generate UV radiation and a second light source may be configured to generate visible radiation. In specific embodiments, the photoreactor assembly may comprise two or more light sources configured at different positions along an arrangement axis. The arrangement axis may e.g. be a length axis, or an axis of symmetry relative to the reactor. Hence, e.g. at different heights, different types of light sources may be provided. Hence, in embodiments the photoreactor may comprise a plurality of light sources wherein the light sources are configured to emit (radiate) light source radiation with different intensities and/or (with different) wavelength distributions. Each light source may also comprise a plurality of light emitting segments emitting (radiating) light source radiation with different intensities and/or wavelength distributions. The light sources and its segments may be arranged parallel or perpendicular to the tube axis. Such light source configurations may allow for a multi-step photochemical process with different wavelengths and/or intensities in one pass.

The term "arrangement axis" may herein especially refer to a length axis of the (photo)reactor assembly. In particular, the reactor and/or the light sources may be arranged around the arrangement axis. The arrangement axis may especially be an axis of rotational symmetry. For example, in an embodiment wherein the light source arrangement defines a hexagon, the arrangement axis may especially have a $C_6$ rotational symmetry. The term may further relate to the tubular arrangement axis. The tubular arrangement axis and the length axis of the reactor assembly may coincide, especially be the same axis.

The term "wavelength" may relate to a plurality of wavelengths. The term may especially refer to a wavelength distribution.

Photochemical reactions may be carried out in the reactor by irradiating fluid in the reactor with the light source radiation. The wall of the reactor may therefore be configured to be transmissive to the light source radiation. The term "transmissive" in the phrase "transmissive to the light source radiation "especially refers to the property of allowing the light source radiation to pass through (the wall). In embodiments, the reactor wall may be translucent for the light source radiation. Yet, in further embodiments, the reactor wall is transparent for the light source radiation. The term "transmissive" not necessarily implies that 100% of the light source radiation provided emitted to the reactor wall may also pass through the wall. In embodiments at least 50% of the light source radiation emitted to the reactor wall may pass through the reactor wall. A relative amount of light source radiation passing through the reactor wall may e.g. depend on the wavelength of the light source radiation.

The reactor wall is in embodiments configured transmissive for UV radiation. In further embodiments, the reactor wall may for instance (also) be configured transmissive for visible radiation. In yet further embodiments, the reactor wall is configured (also) transmissive for IR radiation.

The reactor wall is especially configured in a radiation receiving relationship with the plurality of light sources. The term "radiation receiving relationship" relates to being configured such that radiation (light) emitted by the light source may directly or indirectly be provided to the reactor wall. The radiation (light) may substantially travel along a straight line, directly from the light source to the wall and/or the radiation (light) may travel from the light source to the wall via (light/radiation) reflecting elements (reflective for the light source radiation). Additionally, or alternatively, the radiation (light) may travel to the wall via scattering, diffusion, etc.

In further specific embodiments (at least part of) the reactor support element, especially the support body, is transmissive for the light source radiation. The reactor support element is specific embodiments configured reflective for the light source radiation.

The reactor assembly especially comprises a cooling element (for active and/or passive cooling). The cooling element may comprise the (cooling) fluid transport channel, such as described herein. In further embodiments, the cooling element may (also) comprise the thermally conductive elements. The cooling element may especially be configured for cooling the reactor and/or a light source. Hence, the cooling element is especially configured in thermal contact with the reactor and/or one or more of the plurality of light sources.

The terms "cooling element", "fluid transport channel" and "thermally conductive element" may especially relate to a plurality of cooling elements, fluid transport channels and thermally conductive elements, respectively.

Hence, in further embodiments, the photoreactor assembly comprises one or more cooling elements, wherein the one or more cooling elements comprise one or more of (i) one or more (cooling) fluid transport channels and (ii) one or more thermally conductive elements, wherein the one or more cooling elements are in thermal contact with one or more of (a) the reactor and (b) one or more of the light sources, especially at least with the reactor. In embodiments, one or more fluid transport channels are configured in one or more of the thermally conductive elements.

In further embodiments, the tubular reactor and the light source elements define one or more (cooling) fluid transport channels between the tubular reactor and (the faces of) the light source elements. In such embodiment, especially a fluid transport channel width may be defined by a minimal distance between the tubular reactor and the light source elements. The fluid transport channel width may typically be less than 4 cm, especially less than 2 cm, such as less than 1 cm, such as equal to or less than 5 mm. The transport channel width may be at least 0.2 mm, such as at least 0.5 mm, especially at least 1 mm, or even at least 2 mm. In embodiments the fluid transport channel width is selected from the range of 0.2-40 mm, such as 0.5-20 mm, especially 0.5-10 mm, or 1-5 mm. In further embodiments, (see before) the support element (body) may be comprising one or more (cooling) fluid transport channels. In such embodiment, especially the fluid transport channel width may be defined by a (internal) diameter or width of the channel. As such, the fluid transport channel width may in embodiments (also) be in the range of 0.5-10 cm, such as 5-10 cm or, e.g., 0.5-2 cm. Yet, the channel width may in embodiments also be larger than 10 cm.

In embodiments, the thermally conductive element comprises a heat sink, especially comprising one or more fins (or ribs). In embodiments, the reactor support element, especially the reactor support body, comprises fins. In further specific elements, the light source element may comprise a heat sink. The light source may in embodiments be connected to, especially mounted at, the heat sink. The heat sink may have a reflective surface providing the face of the light source element. A thermally conductive element such as the heat sink may be passively cooled. Yet, in embodiments, a cooling fluid may be forced along the thermally conductive element to actively cool it. The cooling fluid may additionally or alternatively be forced through a cooling fluid transport channel configured in the thermally conductive element (to actively cool it). The cooling fluid may further be provided to the cooling cavity in the support element.

In embodiments, the reactor assembly further comprises an air transporting device, such as a fan or a blower. The air transporting device may especially be configured facing a thermally conductive element. In embodiments the air transporting device is configured to transport air along (and/or through) one or more of the thermally conductive elements, such as along (and/or through) one or more of the heat sinks. The air transporting device may further be configured for transporting air through one or more of the cooling fluid transport channels. The term "air transporting device" may especially relate to a plurality of air transporting devices. Further, also the term "gas transporting device" may be used to refer to the air transporting device (being a device configured to transport a gaseous fluid or a "gas").

Hence, in further embodiments, the reactor assembly further comprises a cooling system configured for transporting a cooling fluid through and/or along one or more of the one or more cooling elements. The cooling system may e.g. comprise the air transporting device (wherein the cooling fluid comprises air). Additionally, or alternatively the cooling system may comprise a liquid transport device, such as a pump configured to pump a liquid (wherein the cooling fluid comprises a liquid). In embodiments, the liquid transport device is configured for providing a liquid cooling fluid to one or more of the (cooling) fluid transport channels.

Herein, the term polygon is used, especially in relation to different arrangements and shapes. A polygon is essentially a two-dimensional figure that is described by a finite number of straight line segments named edges or sides. Herein the term "polygon" may especially refer to a convex polygon. Further, the polygon especially comprises a regular polygon. The polygon may e.g. be a square, a pentagon, a hexagon, a heptagon, an octagon, a nonagon, a decagon, etc., etc. The polygon may in embodiments comprise an n-gon, especially wherein n is at least 3, such as at least 4. In embodiments n is equal to or smaller than 50, especially equal to or smaller than 20, such as equal to or smaller than 12, especially equal to or smaller than 10, such as $4 \leq n \leq 10$. An n-gon comprises n edges or sides. Hence, the polygon(s) described herein may also especially comprise a number of edges equal to n.

Furthermore, phrases like "one or more of the elements define a polygon" may especially indicate that an outline, perimeter, contour or periphery of a cross section of the element defines the polygon. The outline, perimeter, contour, or periphery not necessary comprises all straight edges. Especially, the polygon that substantially corresponds to the contours may be pictured around the element (defining the polygon). For instance, at least 90% of the area of the polygon may correspond to the respective cross section of the element. Furthermore, in embodiments, the edges of the polygon may be straight, however, the corners of the element may be rounded. Yet, in further embodiments the edges many be slightly curved.

The terms "upstream" and "downstream" relate to an arrangement of items or features relative to the propagation of the light or (the fluid) from a light generating means (here the especially the light source) (or a fluid inlet), wherein relative to a first position within a beam of light from the light generating means (or a flow from the inlet), a second position in the beam of light closer to the light generating means (or a second position in the flow closer to the inlet) is "upstream", and a third position within the beam of light further away from the light generating means (or a third position in the flow further away from the inlet) is "downstream".

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB and/or a heat sink Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid state light source, such as a LED, or downstream of a plurality of solid state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering). In embodiments, the light source may comprise a laser module.

The phrases "different light sources" or "a plurality of different light sources", and similar phrases, may in embodiments refer to a plurality of solid state light sources selected from at least two different bins. Likewise, the phrases "identical light sources" or "a plurality of same light sources", and similar phrases, may in embodiments refer to a plurality of solid state light sources selected from the same bin.

The reactor assembly may comprise or may be functionally coupled to a control system. The control system may, especially in an operational mode, be configured to control one or more of the light sources. alternatively or additionally, the control system may, especially in an operational mode, be configured to control the cooling system. Alternatively or additionally, the control system may, especially in an operational mode, be configured to control the fluid transporting device. Further, alternatively or additionally the control system may, especially in an operational mode, be configured to control a flow of a fluid through the reactor.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system but may be (temporarily) functionally coupled to the lighting system.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

In a further aspect, the invention provides a method for treating a fluid with light source radiation. The method especially comprises (i) providing the reactor assembly described herein, wherein the reactor assembly comprises the photoreactor assembly, (ii) providing the fluid to be treated with the light source radiation in the reactor; (iii) (providing light source radiation to the reactor and) irradiating the fluid with the light source radiation, and especially (iv) cooling the reactor support element.

The method especially comprises transporting a cooling fluid through and/or along one or conductive elements comprises by the reactor support element. Especially the cooling fluid is provided to a cooling fluid transport channel and/or a cooling cavity in the reactor support element.

Irradiating the fluid with the light source radiation may induce the photochemical reaction. In embodiment, the (photochemical) reaction comprises a photocatalytic reaction. In embodiments, the method further comprises providing a photocatalyst and or photosensitizer to the fluid prior to and/or during irradiating the fluid with the light source radiation.

In embodiments, the method comprises a batch process. In other embodiments, the method comprises a continuous process. Hence, in specific embodiments, the method comprises transporting the fluid through the reactor while irradiating the fluid with the light source radiation.

The reactor assembly may especially comprise one or more (further) cooling elements (described herein). The method may further comprise transporting the cooling fluid through and/or along one or more (of the other) cooling elements.

In yet further embodiments, the method comprises selecting the light source radiation from one or more of UV radiation, visible radiation, and IR radiation, prior to irradiating the fluid with the light source radiation. The light source radiation may especially be selected by selecting the plurality of light sources to generate the (selected) light source radiation. The light source radiation may further be selected based on the fluid to be treated, especially a (photosensitive) reactant and/or photocatalyst and/or photosensitizer in the fluid.

In further embodiments, one or more of the light source are controlled to radiate different intensities and/or wavelength distributions.

In yet a further aspect, the invention further provides a method for providing a reactor assembly, especially the reactor assembly described herein, wherein the method comprises: (i) providing a reactor comprising a reactor wall, wherein the reactor wall defines a tubular reactor; (ii) providing a reactor support element comprising a track, wherein the reactor support element comprises a thermally conductive element; (iii) arranging the tubular reactor in a tubular arrangement, wherein the track partly encloses the tubular reactor, and wherein the tubular reactor is configured in thermal contact with the thermally conductive element.

In further embodiments, the method further comprises providing a support element base material and fabricating the reactor support element comprising the track from the support element base material.

In embodiments, a cavity comprising the track is provided during forming the reactor support element. In further embodiments, the method further comprises arranging a tubular structure at the reactor support element.

In specific embodiments, fabricating the reactor support element comprising the track comprises forming the support element and optionally arranging a tubular structure at the reactor support element. Forming the support element may especially comprise one or more of machine tooling the support element base material, extruding the support element base material, (iii) die casting the support element base material, and (iv) die casting the base material.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figures 1A, 1B:
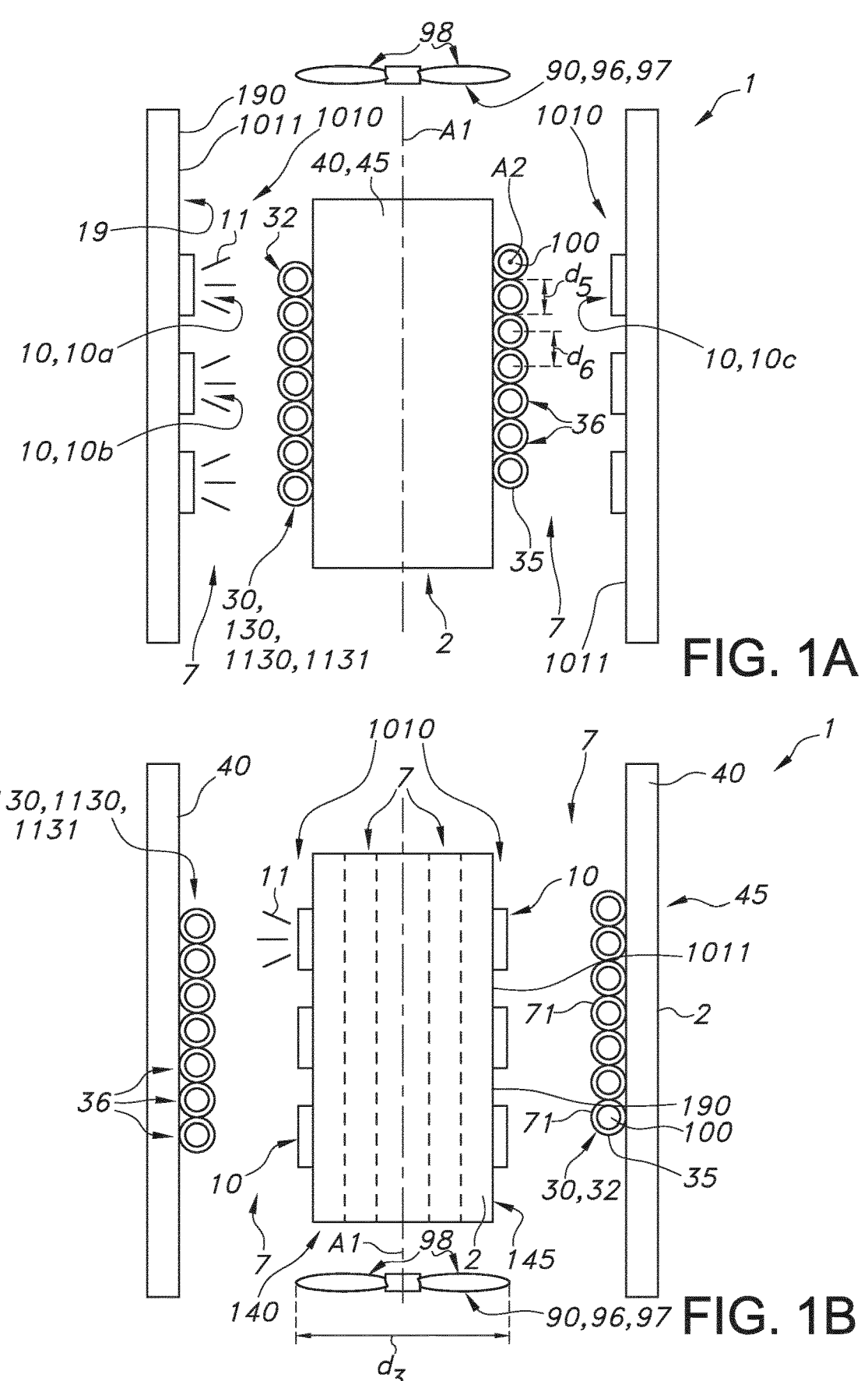
FIGS. 1A-1H schematically depict aspects of the reactor assembly and embodiments of the reactor support element.
Figures 1C, 1D:
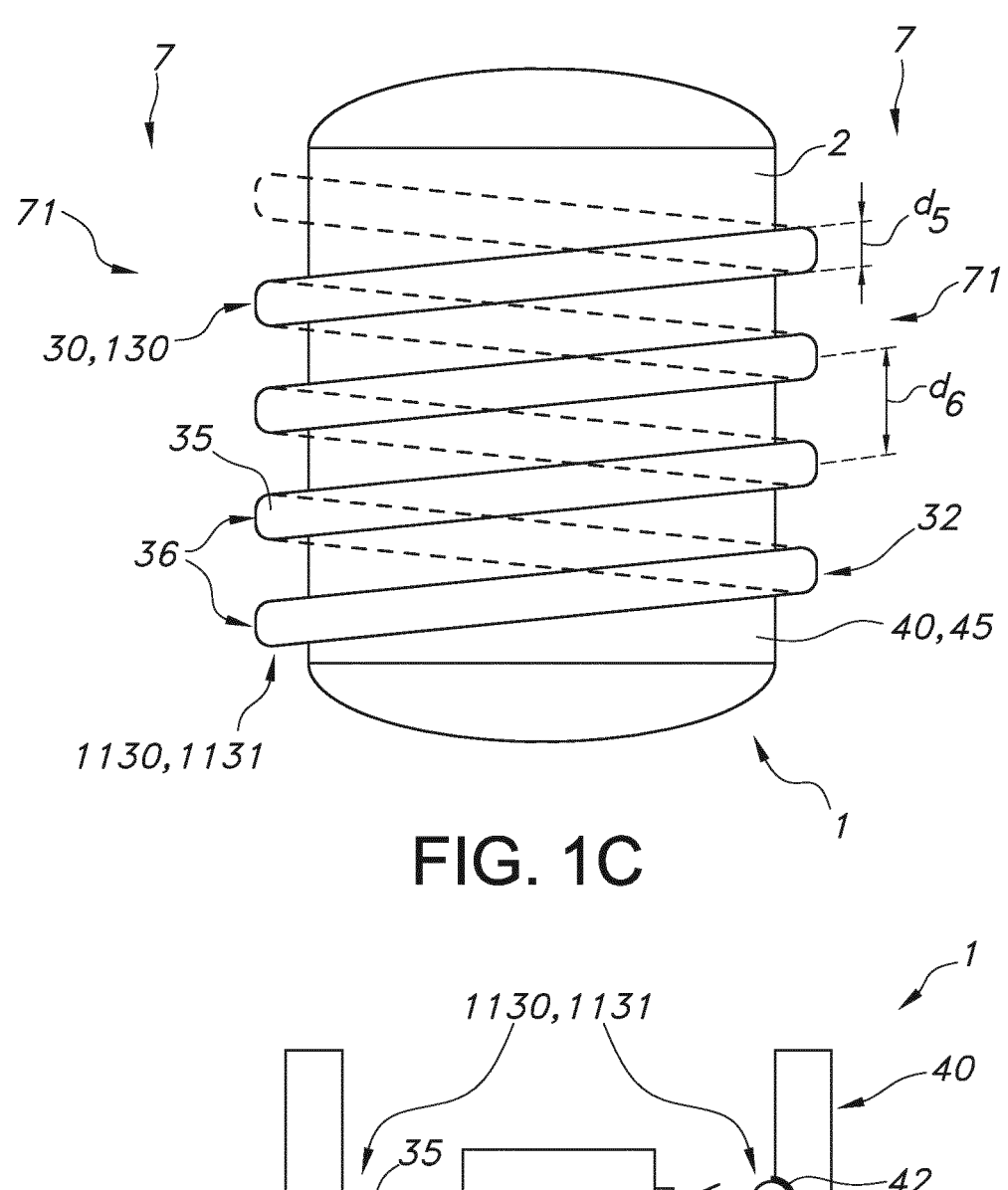

FIGS. 1A, 1B and 1C schematically depict some general aspects of the reactor assembly 1. The reactor assembly 1 comprises a reactor 30 for hosting a fluid 100 to be treated with light source radiation 11. The light source radiation 11 may especially be selected from the group of UV radiation, visible radiation, and IR radiation. The reactor 30 comprises a reactor wall 35 which is at least partly transmissive for the light source radiation 11. The reactor wall 35 may define the reactor 30. In the depicted embodiment, the reactor 30 comprises a tubular reactor 130, especially configured in a tubular arrangement 1130.

Light source radiation 11 may be provided by a plurality of light sources 10, such as depicted in FIGS. 1A and 1B. The light sources 10 are in embodiments comprised by the reactor assembly 1. The reactor assembly may comprise the light sources 10 may also be referred to as a photoreactor assembly. Such light sources 10 may e.g. comprise one or more of chips-on-board light sources (COB), light emitting diodes (LEDs), and laser diodes.

FIGS. 1A and 1B especially depict a cross section of the reactor assembly 1. The reactor 30 is a tubular reactor 130 configured in a tubular arrangement 1130, especially in a coiled tubular arrangement 1131. The coiled tubular arrangement 1131 may be depicted more clearly in FIG. 1C. As is shown by the dashed line connecting the solid lines (together depicting the windings 36), the tubular reactor 130 is helically coiled.

In FIG. 1C and FIG. 1A the tubular reactor 130 is coiled around the reactor support element 40. In the embodiment of FIG. 1A (as well as FIG. 1B) (the reactor wall 35 of) adjacently arranged windings 36 or turns 36 (of the depicted seven windings 36 or turns 36) of the tubular reactor 130 are mutually contacting each other. In these embodiments, the pitch d6 of the tube 30 substantially equals the characteristic outer size d5 (for a circular or round tube being the diameter of the tube) of the tube 30. In FIG. 1C, the adjacently arranged windings do not contact each other and the pitch d6 is about twice as large as the outer size d5, especially the outer diameter d5 of the tube 30.

The (photo)reactor assembly 1 depicted in FIGS. 1A and 1B comprises a light source arrangement 1010 comprising a plurality of light sources 10. This may also be indicates as: the plurality of light sources 10 are arranged in the light source arrangement 1010. The reactor wall 35 is especially configured in a radiation receiving relationship with the plurality of light sources 10. The light source radiation 11 provided by the light sources 10 may directly irradiate the fluid 100 arranged downstream of the reactor wall 35.

Figures 2A, 2B:
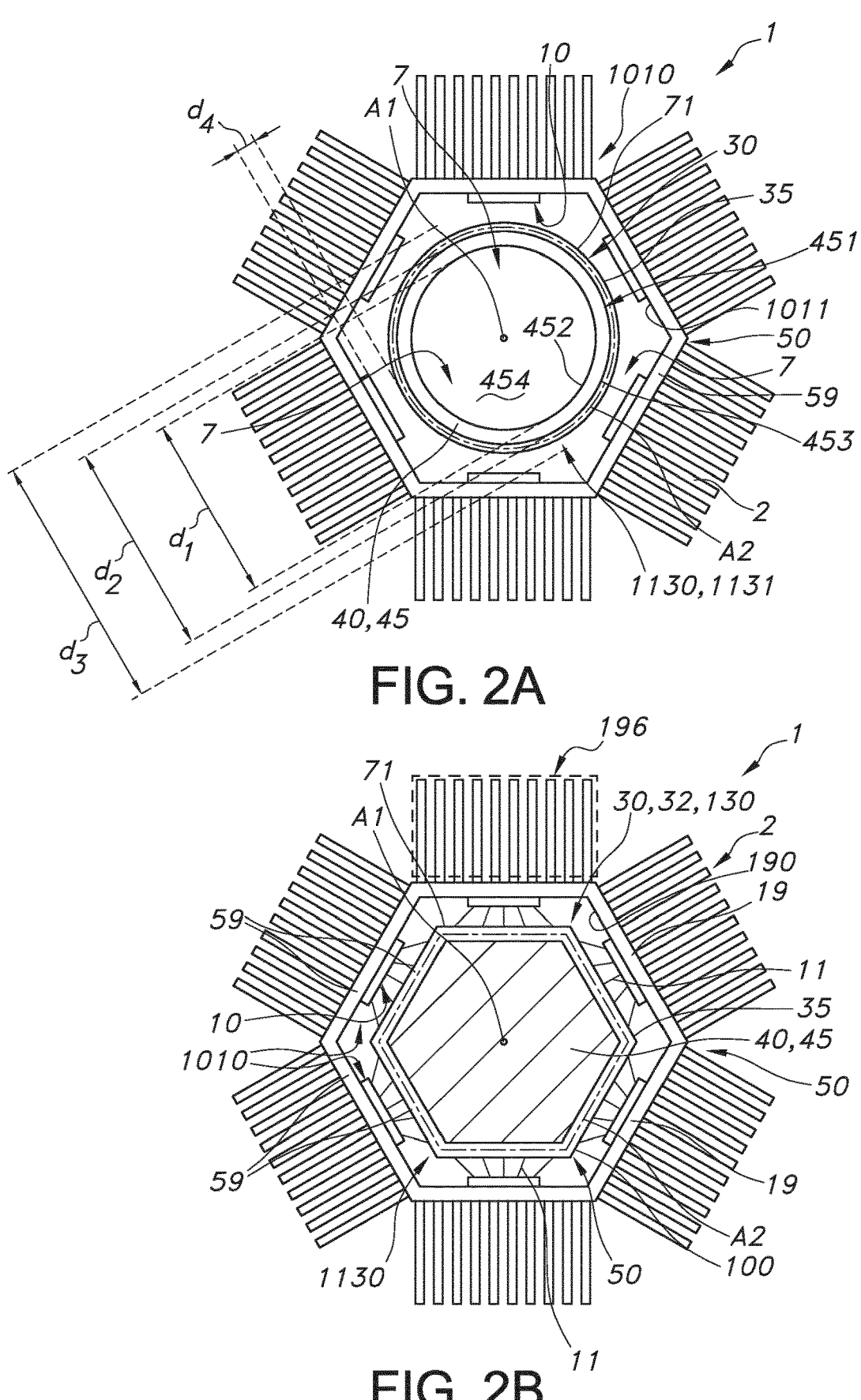
FIGS. 2A and 2B schematically depicts some further aspects of the reactor assembly.

In embodiments, both the light source arrangement 1010 and the tubular arrangement 1130 comprise a cylindrical arrangement. The light source arrangement1130 and the tubular arrangement 1010 may be configured coaxially around the (tubular) arrangement axis A1. In other further embodiments, one or more of the tubular arrangement 1130 and the light source arrangement 1010 defines a polygon 50. This is further depicted in FIGS. 2A and 2B, wherein in the embodiment of FIG. 2A, the light source arrangement 1010 defines the polygon 50, especially a hexagon, and in the embodiment of FIG. 2B, both the light source arrangement 1010 and the tubular arrangement 1130 define the polygon 50. The embodiment of FIG. 2B is an example of an embodiment wherein the tubular arrangement 1130 and the light source arrangement 1010 both define polygons 50 having mutually parallel configured polygon edges 59. The polygons 50 are hexagons and each polygon 50 comprises six polygon edges 59.

In the embodiment depicted in FIG. 1A, (all of) the plurality of light sources 10 enclose the tubular arrangement 1130. In the embodiment depicted in FIG. 1B (all of) the plurality of light sources 10 are enclosed by the tubular arrangement 1130. Yet, in other embodiments, a first subset of the plurality of light sources 10 encloses the tubular arrangement 1130 and a second subset of the plurality of light sources 10 is enclosed by the tubular arrangement 1130. This is very schematically depicted in FIG. 3B, although the light sources 10 are not shown in the figure. Yet the light source radiation 11 is indicated. In such embodiment, especially the reactor support element 40 (not depicted in FIG. 3B) may be transmissive for the light source radiation 11.

FIG. 1A further depicts an embodiment wherein successive windings (turns) of the tubular reactor 130 may be arranged contacting each other substantially along a complete winding 36 (turn 36). The pitch d6 of the tubular reactor 130 may substantially equal a characteristic outer size d5 of the tube 32. In further embodiments (also see FIG. 1C), the pitch d6 may be equal to or less than 10 times the outer size of the tube 32, such as equal to or less than 5 times the outer size of the tube 32. The pitch d6 may in embodiments e.g. be substantially 2 times the characteristic outer size d5 (especially leaving space for a further, especially parallel arranged, tube). Yet, the pitch d6 may in embodiments be larger than 10, such as 50 or 100 times the characteristic outer size d5.

FIG. 1A further schematically depicts an embodiment wherein two or more of the plurality of light sources 10, 10a, 10b, 10c provide light source radiation 11 having different spectral power distributions, i.e., for example, a first light source 10, 10a may provide light source radiation 11 having a different spectral power distribution from the light source radiation 11 provided by a second light source 10, 10b. For instance, a first light source 10, 10a may be configured to generate UV radiation and a second light source 10, 10b may be configured to generate visible radiation. In specific embodiments, the photoreactor assembly 1 may comprise two or more such light sources 10, 10a, 10b configured at different positions along an arrangement axis A1. The arrangement axis may e.g. be a length axis, or an axis of symmetry relative to the reactor. Hence, e.g. at different heights, different types of light sources 10 may be provided. In further embodiments, the photoreactor assembly may comprise two or more such light sources 10, 10a, 10c configured at different sides of the reactor, especially at the same position with respect to the arrangement axis A1 (e.g., at the same height). Hence, at different sides of the reactor, different types of light sources 10 may be provided.

However, FIG. 1A further schematically depicts in fact also an embodiment wherein two or more of the plurality of light sources 10, 10a, 10b, 10c provide light source radiation 11 having identical spectral power distributions. Hence, different options are possible.

FIG. 1B further depicts an embodiment wherein one or more of the plurality of light sources 10, especially all (depicted) light sources, are at least partly configured within at least one of the one or more fluid transport channels 7. Further, FIG. 1B schematically depicts that at least part of the reactor wall 35 is configured within at least one of the one or more fluid transport channels 7, and that at least part of the reactor wall 35 defines part of a channel wall 71 of at least one of the one or more fluid transport channels 7.

FIG. 1C schematically depicts a side view of an embodiment of a reactor 30. In the depicted embodiment, the reactor 30 is a tubular reactor 130, wherein the tube 32 is coiled around a reactor support element 40, especially the support body 45, in a plurality of windings 36. In the depicted embodiment, the successive windings are spaced apart, i.e., the pitch d6 of the tubular reactor 130 is larger than the characteristic outer size d5 of the tube 32, such as $2*d5 \leq d6 \leq 3*d5$.

Further, in the depicted embodiment, the reactor wall 35 defines part of a channel wall 71 of at least one of the one or more fluid transport channels 7.

In the depicted embodiment, the cooling system 90 comprises a fluid transporting device, especially a gas transporting device 96 selected from the group consisting of an air blower, an air sucker, and a fan 97. Hence, in embodiments, the fluid transporting device, especially the gas transporting device, may be configured to blow air (towards the reactor 30) or to suck air (from the reactor 30). The gas transporting device may be arranged above and/or below the reactor, i.e., in embodiments, the gas transporting device 96 may be arranged on a top section of the photoreactor assembly 1, and in further embodiments the gas transporting device 96 may be arranged on a bottom section of the photoreactor assembly 1.

The embodiments depicted in FIGS. 1A, 1B and 1C further comprise a reactor support element 40 to support the reactor 30. The reactor support element 40 may comprise a support body 45. In the three embodiments, the reactor support element 40 is configured rotational symmetrical (around the arrangement axis A1). In the embodiments part of the tubular reactor 130 contacts the support element 40/body 45 and is in thermal contact with the support element 40. Such configuration may facilitate dissipation of heat from the tubular reactor 130 to the support element 40, especially if the support element 40 comprises a thermally conductive element 2 or is thermally connected to such thermally conductive elements 2. The thermally conductive element 2 may comprise a heat sink, optionally comprising fins. Such heat sinks (thermally conductive elements 2) are e.g. schematically indicated in FIG. 2 in thermal contact with the light sources 10. The thermally conductive element 2 of the support element 40 may also be defined by (at least a part of the) support element comprising (or made of) a thermally conductive material.

FIGS. 1A, 1B and 2A and 2B, further depict that the (tubular) arrangement axis A1 and the tube axis A2 are configured almost perpendicular to each other.

The light sources 10 may be arranged at a light source element 19, such as demonstrated in FIG. 1A. Yet in embodiments, the reactor assembly 1 comprises a light source support element 140 configured to support the plurality of light sources 10 (see FIG. 1B). The light source support element 140 especially comprises a light source support body 145. Such light source support element 140, especially light source support body 145 may especially also comprise cooling element 95 such as a fluid transport channel 7. In FIG. 1B for instance an embodiment comprising the light source support body 145, is depicted. In the depicted embodiment, the light source support body 145 comprises one or more of the one or more fluid transport channels 7. The light support element 140 may in embodiments comprise (or be defined by) a number of light source elements 19.

The embodiment of FIG. 1B, further shows a cooling system 90 comprising a fluid transporting device, especially a gas (or air) transporting device 96 comprising a fan 97. The fan 97 comprises ventilator blades 98 defining a blade diameter d3.

FIGS. 1D-1H further depict elements of the reactor support element 40 comprises a track 42 to enhance heat dissipation. Such track 42 (only for the sake of illustration indicated with thicker lines) especially partly encloses the tube 30 of the tubular reactor 130. Moreover, the reactor support element 40 especially comprises a thermally conductive element 2 configured in thermal contact with the tubular reactor 130. As such, heat from the reactor 30 may flow to the support element 40 and optionally away from the support element 40. In embodiments, e.g. the reactor support element 40 comprises a fluid transport channel 7, e.g. depicted in FIG. 2A through which a cooling fluid 91 (or temperature control fluid) can be flown. The cooling fluid 91 may transfer the heat away from the support element 40. Additionally or alternatively, the support element 40 may comprise a heat sink to actively or passively cool the support element 40. The track 42 especially increases a (thermal) contact area between the support element 40 and the reactor 30.

FIG. 1D further depicts the reactor 30 being a tubular reactor 130 configured in a tubular arrangement 1130 wherein the tubular arrangement 1130 comprises a coiled tubular arrangement 1131. Although the cross section may not actually show this, it may be understood that in the embodiment, both the tubular reactor 130 and the track 42 are helically coiled.

Figures 1E, 1F, 1G, 1H:
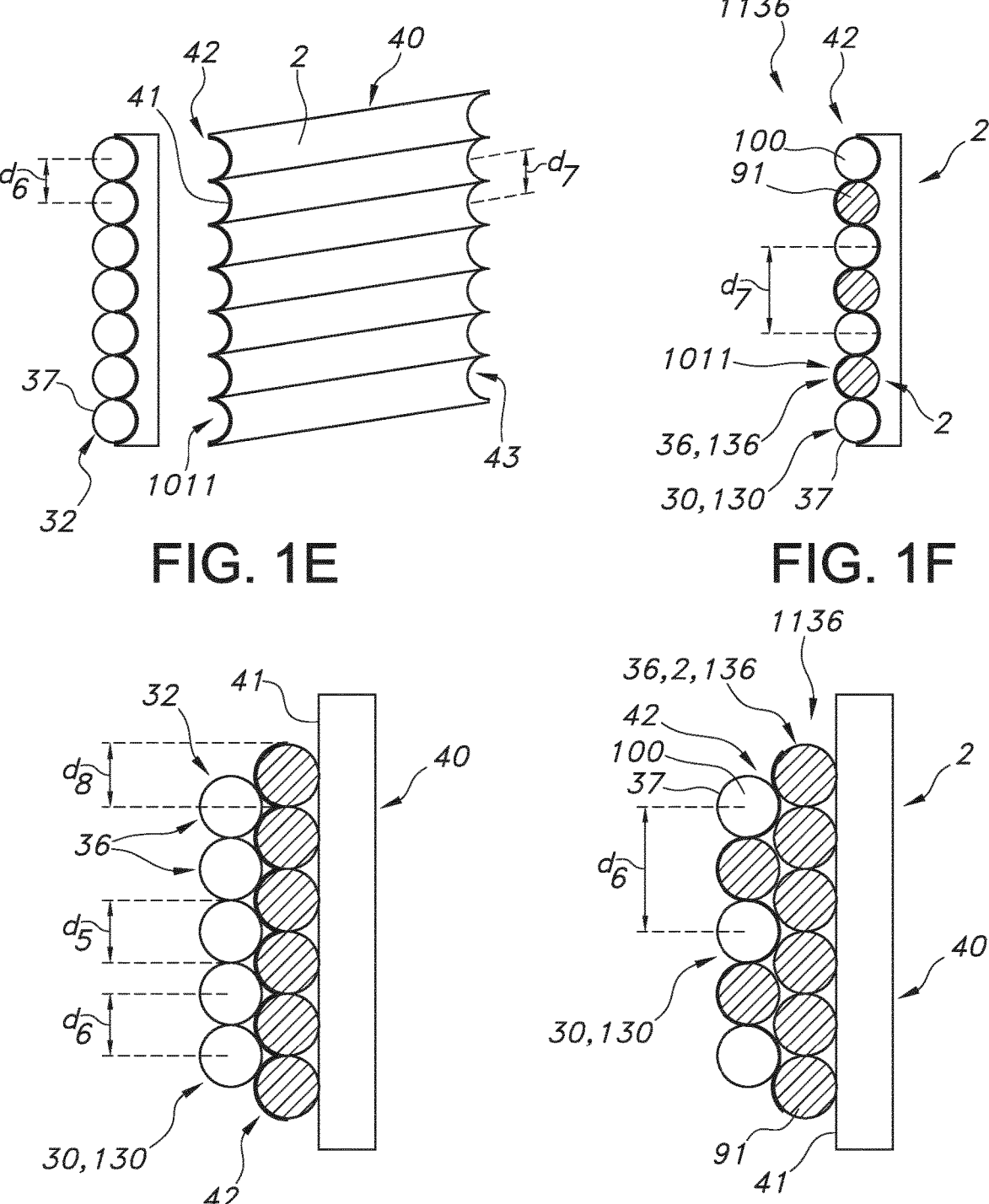

In embodiments, e.g., depicted in FIGS. 1D-1F, the support element surface 41 of reactor support element 40 comprising a cavity 43 defining at least part of the track 42. In FIGS. 1D and 1E the entire track 42 is defined in the surface 41 of the reactor support element 40. Furthermore, FIG. 1D depicts an embodiment wherein the tubular reactor 130 is coiled inside the support element 40. In FIG. 1E, the tubular reactor 130 is coiled around the support element 40 (depicted at the right hand side of FIG. 1E without the reactor 30, whereas only part of the support element 40 is depicted at the left hand side with the reactor in the cavity 43). FIG. 1E further depicts that the pitch d6 of the tube 32 substantially equals the pitch d7 of the track 42. As such, adjacently arranged parts of the tube 32 mutually contact each other. The support element 40 depicted in FIG. 1E may be made of aluminum. The support element 40 may then be thermally conductive, and as such comprises, especially is, the thermally conductive element 2. Moreover, aluminum may reflect the light source radiation 11. The surface 41 of the support element 40 is especially reflective for the light source radiation 11 and may therefore comprise the reflective element 1011. Hence, in such embodiment the thermally conductive element 2 comprises the reflective element 1011.

In further embodiment, the surface 41 of the support element 40 may comprise a thermally conductive coating that may be reflective for the light source radiation 11, e.g. a silver comprising coating or a di-chroic coating layer.

In FIGS. 1E-1H embodiments are depicted wherein the reactor support element 40 comprises a tubular structure 136 defining (at least part of) the track 42. Like with the cavity 43, also such tubular structure 136 partly encloses the tubular reactor 130. The tubular structure 136 may comprise a solid tubular structure 136 especially made of a thermally conductive material. In the depicted embodiments, the tubular structure 136 comprises tubing 36. The tubing 36 may in the embodiments host a cooling fluid 91. Especially, (also) the tubing 36 is helically coiled.

In the embodiment of FIG. 1G, the tubular structure 136, especially the tubing 36, is configured directly contacting the surface 41 of the support element 40 thereby defining the track 42 at a location extending from the support element 40. The diameter d8 of the tubing 36 is selected equal to the diameter d5 of the tube 32 of the reactor 30. As such, the adjacent windings 36 of the tube 32 contact each other, and the pitch d6 of the coiled tube 32 of the reactor 30 substantially equals the outer size d5 of the tube 32.

In the embodiment depicted in FIG. 1F, the tubular structure 136, especially the tubing 36, is also configured directly contacting the surface 41 of the support element 40. However, the pitch of the tubing 36 is twice the diameter d8 of the tubing 36 thereby defining the track 42 with a pitch d7 that equals the total of the outer size d8 of the tubing 32 and the outer size d5 of the tube 31. In such embodiment, windings 36 of the tube 32 and windings of tubular structure 136, especially the tubing 36, are alternatingly arranged coiling around the support element 40 (as well as the (tubular) arrangement axis A1). In such embodiment, each two windings of the tubular structure 136 (tubing 36) sandwiches a tube 32 winding 36 (and vice versa).

The embodiment of FIG. 1H is a combination of the embodiments of FIG. 1E and FIG. 1G. In the embodiment a first part of the tubing 36 is arranged directly at the surface 41 of the support element 40, and a further part of the tubing 36 is arranged at the first part of the tubing 36, the parts together defining the track 42. Again the tube 32 is sandwiched by the tubular structure 136. FIGS. 1F and 1H are examples of embodiments wherein the tubing 36 is configured in thermal contact with the tubular reactor 130, and wherein the tubing 36 and the tubular reactor 130 are configured in a sandwich arrangement 1136 with the tubing 36 sandwiching the tubular reactor 130.

The embodiments in FIGS. 1D-1H all depict that the surface 41 of the track 42 more or less corresponds to the outer surface 37 of the reactor wall 35 Depending on the configuration about 20-50% of the reactor wall 35 is in physical contact with the surface 41 of the track 42. The Figures further depict that in embodiments the surface 41 of the track 42 comprises the reflective element 1011, and in further embodiments (also) the tubing 36 comprises the reflective element 1011.

FIGS. 2A and 2B depict some further embodiments of the reactor assembly 1.

FIG. 2A depicts an embodiment of the reactor assembly 1, wherein the support element 40 comprises a support body 45. The support element 40 comprises a hollow (tubular) body, wherein the hollow body comprising a support body wall 451. The support body wall 451 comprises an inner support body face 452 and an outer support body face 453. In the depicted embodiment, the inner support body face 452 defines at least one of the one or more fluid transport channels 7. Further, in the depicted embodiment, the reactor 30 is configured at the side of the outer support body face 453. In alternative embodiments, the reactor may be configured at the side of the inner support body face 452, especially wherein the reactor defines an (inner) fluid transport channel 7. In the depicted embodiment, the inner support body face 452 may define a support body space 454, wherein 30-100 vol. %, especially 50-99 vol. %, of the support body space 454 is defined by the fluid transport channel 7. In the depicted embodiment, the support body space 454 may be essentially an open ("hollow") space. However, in alternative embodiments, the support body space 454 may be partially filled with a filler material, such as filled with a thermally conductive material, especially wherein the filler material defines a plurality of fluid transport channels 7. The support body wall 451 may have a circular cross-section, especially wherein the inner support body face 452 and the outer support body face 453 define diameters d1, d2, respectively. Further a blade diameter d3 of ventilator blades 98 of a possible fan 97 is schematically depicted. The blade diameter d3 is in embodiments especially selected larger than the outer size of the support body 45 defined as d2.

FIG. 2B further schematically depicts an embodiment, wherein the (photo)reactor assembly 1 comprises a plurality of light source elements 19, wherein each light source element 19 comprises one or more of the plurality of light sources 10, and wherein each of the light source elements 19 comprises at least one thermally conductive element 2 configured in functional, especially thermal contact with the one or more of the plurality of light sources 10. The light source element 19 further comprises a reflective element 1011 at a surface 190 of the light source element 19 facing the reactor wall 35. In the depicted embodiment, the (photo) reactor assembly 1 further comprises a (second)fluid transporting device 196 configured to transport a cooling fluid 91 along one or more of the thermally conductive elements 2 configured in functional contact with one or more of the plurality of light sources 10. For visualizational purposes, a single (second) fluid transporting device 196 is depicted very schematically. However, in further embodiments, each light source element 19 may be functionally coupled with a (respective) (second) fluid transporting device 196. A single (second) fluid transporting device 196 may also be functionally coupled with a plurality of light source elements 19. The second fluid transporting device 196 especially comprises or is an air (or gas) transporting device 96.

Figure 3A:
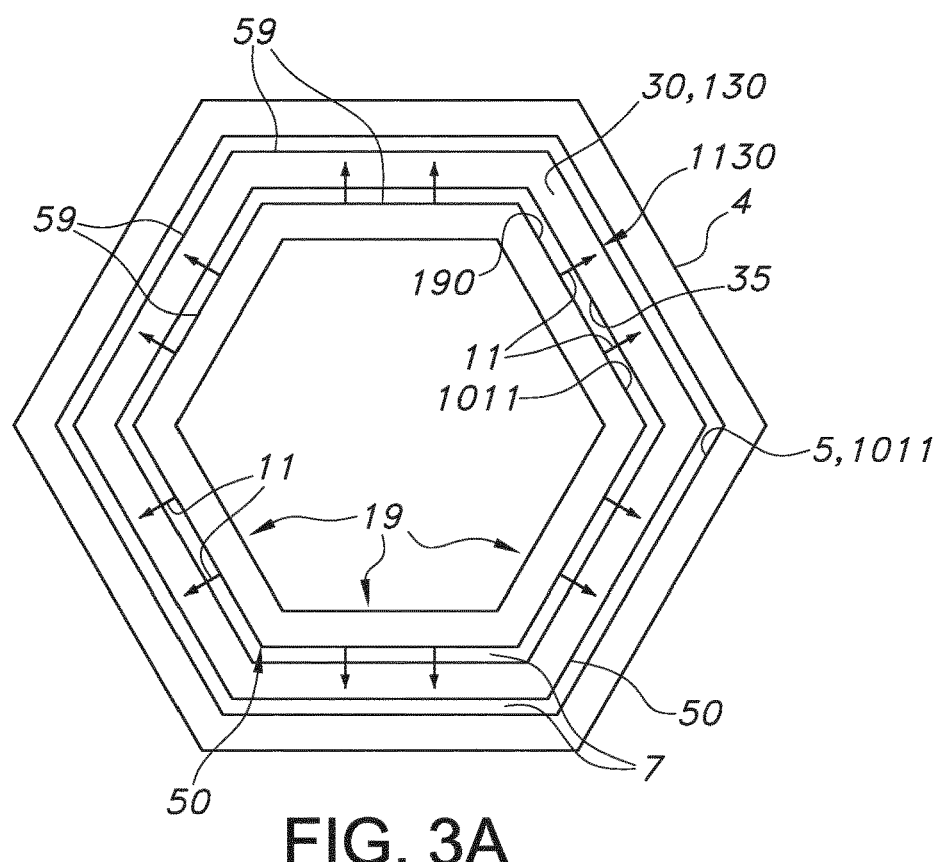
FIGS. 3A and 3B very schematically depicts some embodiments of the photoreactor assembly with different light source arrangements.
Figure 3B:
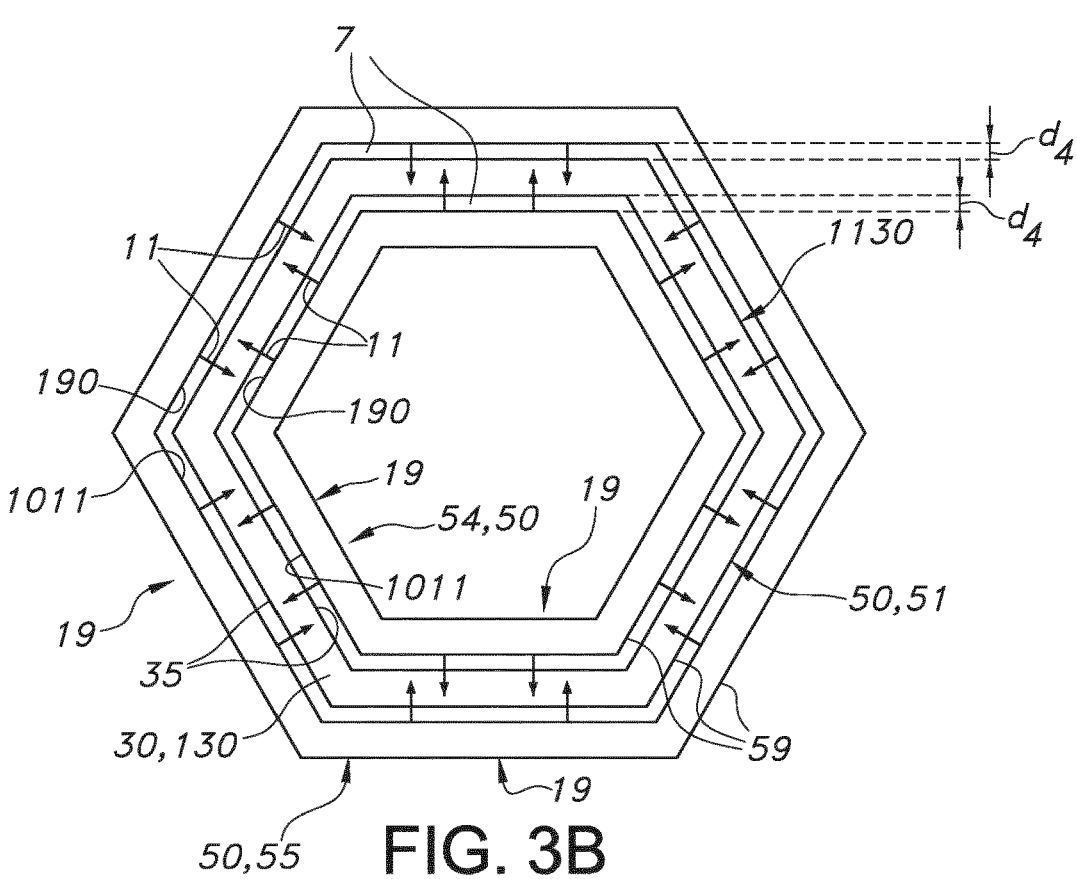

In FIGS. 3A and 3B, some further aspects of embodiments of the assembly 1 are depicted. The figures schematically depict the reactor assembly 1 comprising a number of light source elements 19. In FIG. 3A the photoreactor assembly 1 comprises six light source elements 19. In FIG. 3B the photoreactor assembly 1 comprises twelve light source elements 19. Each light source element 19 comprises one or more light sources 10. The light source element 19 may further comprise at least one thermally conductive element 2 configured in thermal contact with the light source 10 (as is depicted in e.g. FIG. 2B). The light source element 19 may further comprise a reflective element 1011 (reflective for the light source radiation 11) at a surface 190 of the light source element 19 facing the reactor wall 35.

In the embodiment in FIG. 3A, the light sources 10 are enclosed by the tubular arrangement 1130. In the figure, the light sources 10 are not shown, yet may be understood from the arrows depicting the light source radiation 11. To prevent light source radiation 11 from escaping from the photoreactor assembly 1, the embodiment of FIG. 3A (also) comprises a wall 4 with a reflective element 1011, especially a reflective surface 5 (facing the tubular reactor 130) enclosing the tubular reactor 130 and the light sources 10. The reflective element 1011 and/or reflective surface 5 is especially reflective for the light source radiation 11. The reflective element 1010 and/or surface 5 may reflect back any radiation that is not absorbed by the fluid 100. This may further provide an improved light homogeneity over the fluid 100.

In the embodiment of FIG. 3B, the first subset of the of light sources 10 (as indicated by the arrows depicting light source radiation 11) enclose the tubular arrangement 1130 and the second subset of the light sources 10 are enclosed by the tubular arrangement 1130. In the embodiment, the first subset of the plurality of light sources 10 define an outer light source polygon 50, 55 and the second subset of the plurality of light sources 10 define an inner light source polygon 50, 54. The tubular arrangement 1130 defines yet a further polygon 50, 51. Also in this embodiment, the tubular arrangement 1130 and the light source arrangement 1010 (comprising the two subsets of light sources 10) both define polygons 50, 51, 54, 55 having mutually parallel configured polygon edges 59.

The photoreactor assembly 1 may especially comprise one or more cooling elements 95, e.g., comprising one or more fluid transport channels 7 and/or one or more thermally conductive elements 2. In FIG. 3A and FIG. 3B, fluid transport channels 7 between the tubular reactor 130 and the light source elements 19 are defined by the tubular reactor 130 and the light source elements 19. Furthermore, between the wall 4 and the tubular reactor 130 (also) a fluid transport channel 7 may be defined. Comparable fluid transport channels 7 are depicted in the embodiments of FIGS. 1 and 2. Such fluid transport channel 7 may have a width d4, e.g. in the range of 1-5 mm. Yet, in embodiments, see e.g. FIG. 2A wherein a (straight) fluid transport channel 7 is (also) configured, especially as a through opening, in the support body 45, the width d1 may be larger than 5 cm. In further embodiments, fluid channels 7 may be defined in any of the thermally conductive elements 2, especially having a width d1, d4 that may be smaller than 5 cm, and e.g. larger than 0.5 cm. For instance in embodiments, a fluid transport channel 7 may be defined in the support body 45 starting at a first side of the body and ending at the same side of the body 45. The fluid transport channels 7 may be used for cooling. In FIGS. 1-3, the channels 7 are all in thermal contact with the reactor 30 while most of them are also in thermal contact with the light sources 10.

Hence, the reactor support element 40, especially the support body 45, may especially be solid or hollow, especially comprising a cavity and/or a fluid transport channel 7. The reactor support element 40, especially the support body 45, may further comprise a heatsink, especially comprising fins. In embodiments, the reactor support element 40, especially the support body 45, is finned. The reactor support element 40, especially the support body 45, may thus be configured for facilitating a flow of a cooling fluid 91 (e.g. air 91, 92 and/or water 91, 93 or another cooling liquid 91, 93) through and/or along the reactor support element 40.

Figure 5:
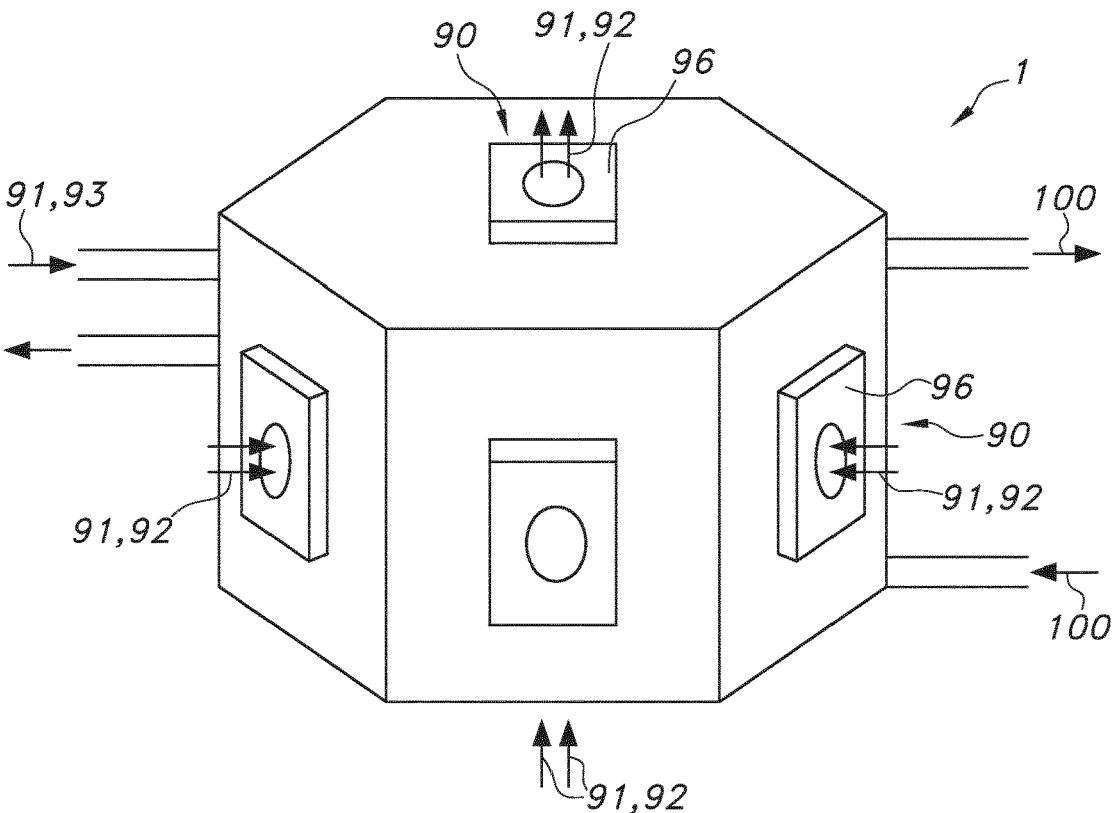
FIG. 5 schematically depicts some aspects of the cooling system of the reactor assembly.

Elements of the cooling system 90 are further depicted in FIG. 5. The cooling system may comprise the cooling elements 95. The cooling system 90 is especially configured for transporting the cooling fluid 91 through and/or along one or more of the one or more cooling elements 95 (especially fluid transport channels 7 and/or thermally conductive elements 2). The cooling system90 may e.g. comprise an air transporting device 96 for transporting a gaseous fluid 91, 92, especially air 91, 92 through one or more of the fluid transport channels 7 and along one or more the thermally conductive elements 2. Additionally or alternatively a liquid (cooling) fluid, 91, 93 may be used, and the cooling system may comprise a pump for transporting the liquid cooling fluid 91, 93. In the embodiments of FIG. 5, for instance, the (photo)reactor assembly 1 comprises air (or gas) transport devices 96, such as a fan 97, configured for transporting gas, especially air, along thermally conductive elements 2 in thermal connection with the light sources 10, such as heat sinks of the light source element 19. Further a pump may be arranged to pump a liquid cooling fluid 91, 93 through e.g. some of the fluid transport channels 7. In the embodiment also air 91, 92 is transported through one or more of the fluid transport channels 7 via a fan 90, 96, 97 arranged at one of the extremes of the (photo)reactor assembly 1 along the tubular arrangement axis A1 (see e.g. FIGS. 1A and 1B). The cooling system 90 may comprise the (second) fluid transporting device 196.

Figure 4:
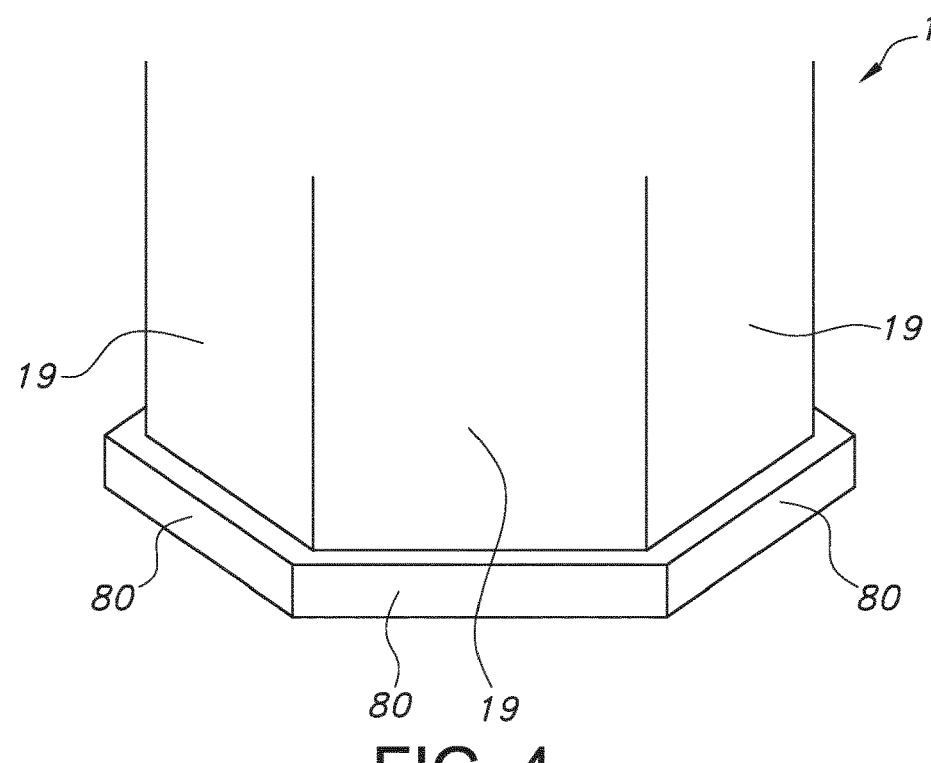
FIG. 4 schematically depicts some furthers aspects of the reactor assembly.

The light source elements 19 are in embodiments removably housed in the photoreactor assembly 1. The photoreactor assembly 1 may e.g. comprise light source element receiving elements 80 configured for removably housing the light source elements 19, as is very schematically depicted in FIG. 4. In embodiments, every single light source element 19 may be removed separately. Yet, in further embodiments, (at least part of) the light source elements 19 together form a light source unit, and the light source unit(s) may be removably housed in the light source element receiving elements 80. The light source element receiving elements 80 may therefore also define a light source unit receiving unit (for removably housing the light source unit).

Figure 6A:
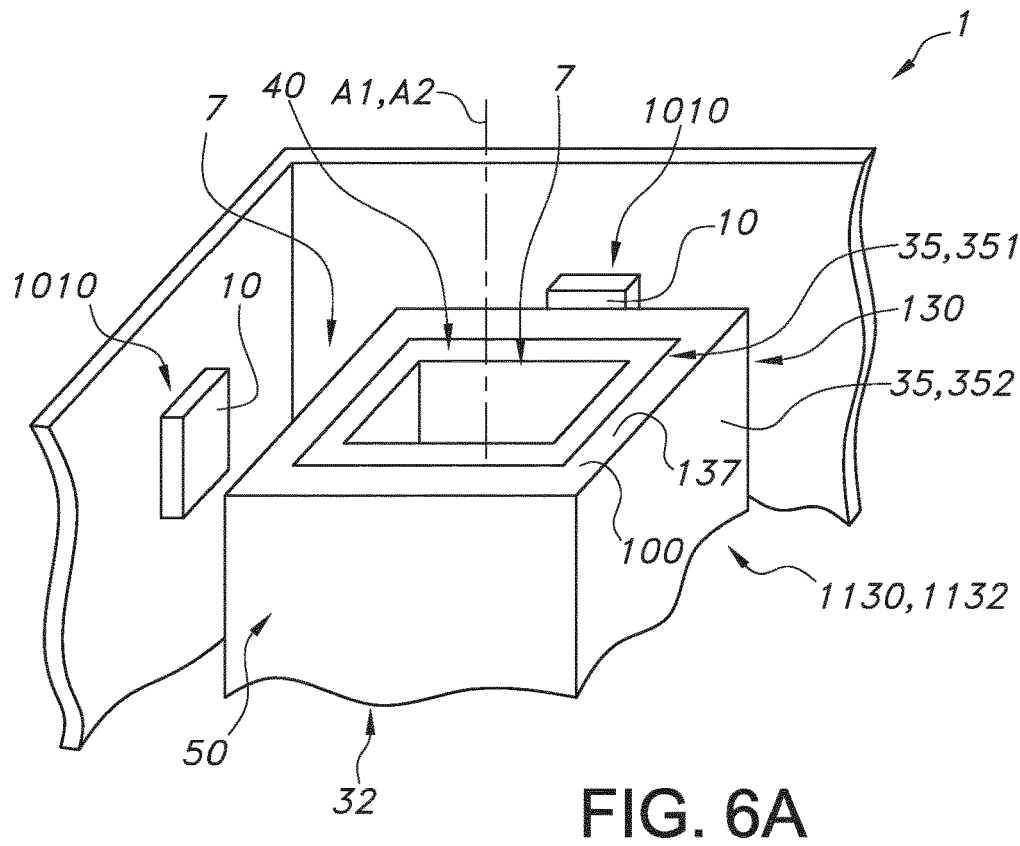
FIGS. 6A and 6B schematically depict some embodiment of a straight tubular arrangement.

In FIG. 6A, aspects of a further embodiment of the photoreactor assembly 1 are depicted. In this embodiment, the support element 40 defines a first (inner) reactor wall 35 and the tube 32 defines a second (outer) reactor wall 35 of the tubular reactor 130. In other embodiments, the support element 40 may enclose the tube 32 and the tube 32 defines the inner reactor wall 35 and the support element 40 the outer reactor wall 35. The tubular reactor 130 actually comprises a first (inner) reactor wall 351 and a second (outer) reactor wall 352 together defining the tubular reactor 130. In such configuration, the support element 40 may directly contact the fluid 100 and a heat transfer from the reactor 30 to the support element 40 may be increased. Hence, in embodiments, the tubular reactor 130 comprises a straight tubular reactor 130. Herein such tubular arrangement 1130 may also be referred to as a straight tubular arrangement 1132. The tubular reactor 130 may thus (also) have an inner wall 351 and an outer wall 352. Depending on the configuration of the light source arrangement 1010 (not depicted in the figure) the inner reactor wall 351, the outer reactor wall 352 or both walls 351, 352 are configured at least partly transmissive for the light source radiation 11. In this embodiment, the tubular arrangement define the polygon 50 (a square). In the embodiment, the fluid 100 may flow in the channel configured between the inner wall 351 and the outer wall 352. Herein such channel is also referred to as (square) annulus 137.

Figure 6B:
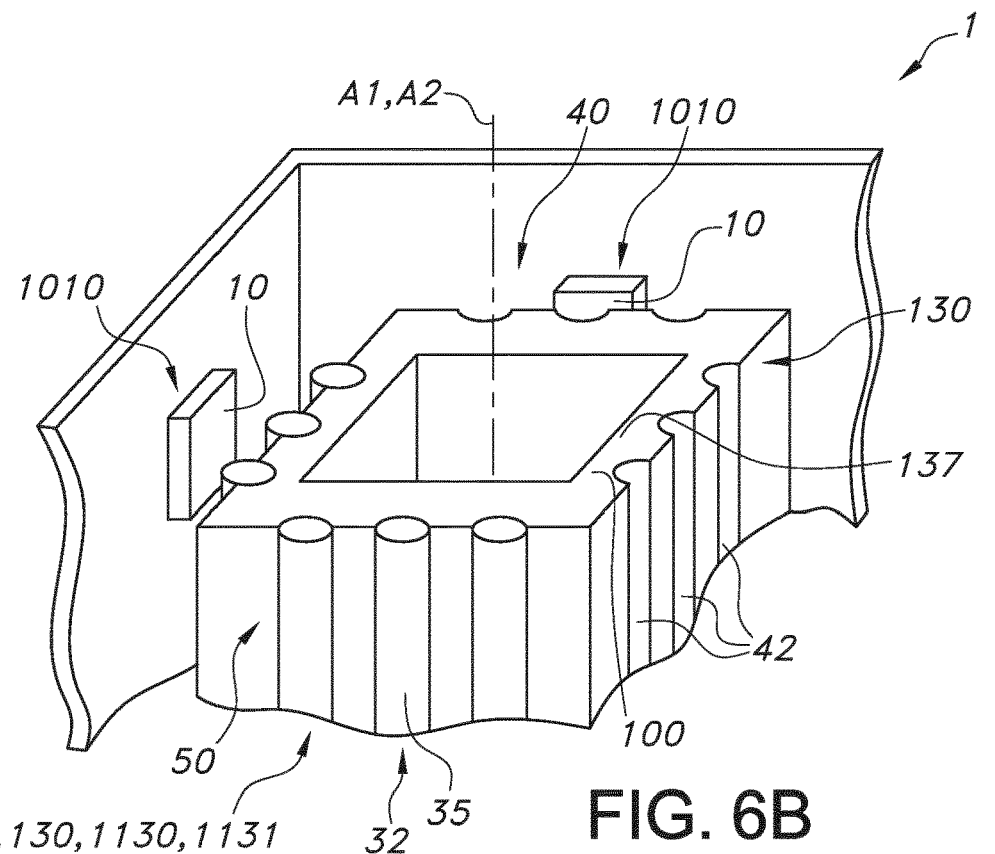

As an alternative of the depicted embodiment, the tubular reactor 130 may also be defined by a plurality parallel tubes 32, together defining the reactor 30, see FIG. 6B. The tubes 32 are especially partly enclosed by the track 42 configured in the support element 40. The tube axis A2 of the plurality of tubes 32 (as well as the tube axis of the embodiment of FIG. 6A) may especially also be configured parallel to the (tubular) arrangement axis A1. Yet, in embodiments, the plurality of tubes 32 in such embodiment may be configured at an angle with respect to the tubular arrangement axis A1. Such angle is especially an acute angle. The tubular reactor especially comprises a plurality of straight tubes 32 and (also) the track 42 comprises a plurality of straight tracks 42. Herein, the tubular arrangement 1130 of the plurality parallelly arranged tubes 32 may also be named a straight tubular arrangement 1132.

The photoreactor assembly 1 described herein may be used for treating the fluid 100 with light source radiation 11. During use, the fluid 100 is provided in the reactor 30 and irradiated with the light source radiation 11. The method may comprise a batch process. Yet, the method may especially comprise a continuous process. During the continuous process, the fluid 100 is transported through the reactor 30 while irradiating the fluid 100 with the light source radiation 11. Simultaneously a cooling fluid 91 may be transported through and/or along one or more cooling elements 95 as is schematically depicted in FIG. 5.

Figures 7A, 7B, 7C:
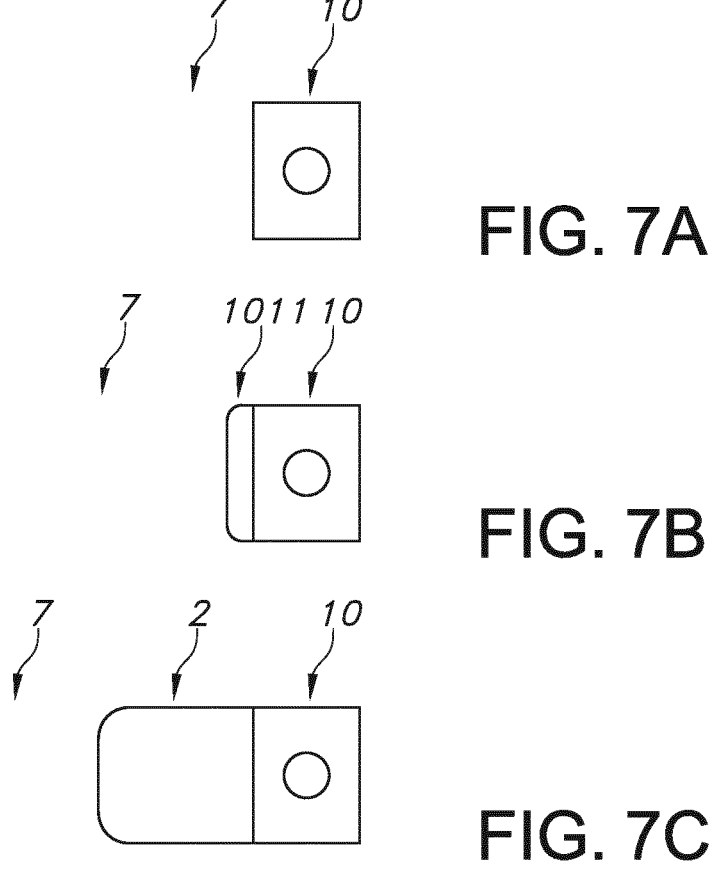
FIG. 7A-C schematically depict further features of embodiments of the photoreactor assembly. The schematic drawings are not necessarily to scale.

FIG. 7A-C schematically depict further features of the reactor assembly 1. The figures may explain thermal contact in general such as between the tubular reactor 130 and the support element 40, between the light source 10 and the fluid transport channel 7, and e.g. the tubular structure 136 and the tubular reactor 130. Thermal contact is explained based on the thermal contact between the light source 10 and the fluid transport channel 7. In particular, FIG. 7A-C schematically depict thermal contact between a light source 10 and a (cooling) fluid transport channel 7. In each of FIG. 1A-1C, the light source 10 and the fluid transport channel 7 are in functional contact, especially thermal contact, i.e., the fluid transport channel 7 may facilitate cooling of the light source 10. In FIG. 7A, the light source and the fluid transport channel 7 are in direct (fluid) contact. In FIG. 7B, the light source and the fluid transport channel 7 are separated by a reflective element 1011, wherein heat may dissipate from the light source 10 to the fluid transport channel 7 via the reflective element 1011. In FIG. 7C, the light source 10 and the fluid transport channel 7 are separated by a thermally conductive element 2, such as a metal block, or such as fins. Hence, in such embodiment, heat may dissipate from the light source 10 to the fluid transport channel 7 via the thermally conductive element 2.

Hence, the invention provides embodiments of a reactor 30 with light sources 10 that can easily be replaced (for instance when a certain reaction needs a specific wavelength region), and may have a very high efficiency, both in terms of light/radiation output versus power input of the source, and in capturing of the radiation by the reactants. In embodiments, the assembly 1 comprises a hexagonal enclosure formed by six or eight light source elements 19 comprising a heatsink 2, each carrying one or more COBs 10. The heatsinks 2 may especially facilitate cooling of the light sources 10 and maintaining the COB 10 at a low temperature (for maximum efficiency).

In embodiments, a COB 10 (with or without phosphor) and/or an array of LEDs 10 (not necessarily of the same type) is configured on a heatsink 2 that is big enough to keep the COB 10 or LEDs 10 at a low temperature. For instance, three to ten of such heatsinks 2 (configured as light source elements 19) are slit into a frame 80 in such a way that they form a polygonal structure 50/enclosure. The fluid 100 containing (photosensitive) reactants may be flown through a tiny tube 32 that is coiled around a core comprising a body support 45 with the same polygonal shape 50 (in embodiments with rounded edges to prevent damaging of the tube 32 while coiling, taking the minimum bending radius of the tube into account, depending on the tube diameter). The core 45 and tube 32 may in embodiments be placed in the enclosure from top or bottom side. The coiled tube 32 especially extends over the whole height of the enclosure, so all radiation 11 radiated by the sources 10 may imping on the coiled tube 32, and especially no light source radiation 11 will escape from top or bottom, or imping on other parts of the enclosure.

Hence, the invention especially relates to a flow reactor 10 for photochemical processes, especially to a reactor assembly 1 for hosting a fluid 100 to be treated with light source radiation 11. Especially wherein the light sources 10 can be cooled via the thermally conductive elements 2, such as heatsinks (that in embodiments can be equipped with fans 97 or a cooling fluid 91). The tube 32 with reactants may in embodiments can be cooled via the support element 40 configured enclosed by the tubular reactor 130 and/or configured enclosing the tubular reactor 130 The tube 32 with reactants may in further embodiments be cooled via a (forced) air flow in the area between tube 32 and light sources 10. The support element 40 is especially configured having a track 42, especially a cavity 43 in which the tube 32 can be positioned for optimal contact. In further embodiments, the support element 40 may be covered by a (first) (coiled) tubular structure 136, e.g. tubing 36 through which cooling fluid 91 may flow. This (first) tubing may serve as a "spiraled groove" or track 42 in which a second tube 32 carrying the reactants can be arranged (coiled). The (first) tubing 36 may be made of a material that has a high thermal conductivity and is highly reflective for the radiation 11 emitted by the light sources 10 (for instance aluminum).

Herein the aspects of the invention are explained in relation to cooling the reactor assembly 1, especially the reactor 30. It will be understood that in alternative embodiments, the cooling system 90 and elements of the cooling system 90, such as the thermal conductive elements 2 and the fluid transport channels7 may be used to control the temperature is such a way that e.g. the reactor assembly 1 and/or the reactor 30 are not cooled but heated.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A reactor assembly comprising a reactor, wherein the reactor is configured for hosting a fluid to be treated with light source radiation selected from one or more of UV radiation, visible radiation, and IR radiation, wherein the reactor comprises a reactor wall which is transmissive for the light source radiation, wherein:

the reactor is a tubular reactor, and wherein the reactor wall defines the tubular reactor;

the tubular reactor is configured in a tubular arrangement;

the reactor assembly further comprises a reactor support element, wherein the reactor support element comprises a track, wherein the track partly encloses the tubular reactor, wherein the reactor support element comprises a thermally conductive element, and wherein the tubular reactor is configured in thermal contact with the thermally conductive element;

wherein the tubular arrangement comprises a coiled tubular arrangement, wherein the tubular reactor is helically coiled, and wherein the track is helically coiled;

wherein the reactor assembly comprises a photoreactor assembly, wherein the reactor assembly further comprises a light source arrangement comprising a plurality of light sources configured to generate the light source radiation, wherein the reactor wall is configured in a radiation receiving relationship with the plurality of light sources;

wherein the reactor support element comprises a support element surface comprising a cavity, wherein the cavity defines the track;

wherein a surface of the track corresponds to at least part of an outer surface of the reactor wall.

2. The reactor assembly according to claim 1, wherein the cavity defines at least a part of a circle.

3. The reactor assembly according to claim 2, wherein the part of the circle equals to or is less than 180° of the circle.

4. The reactor assembly according to claim 1, wherein the plurality of light sources comprise one or more of chips-on-board light sources (COB), light emitting diodes (LEDs), and laser diodes.

5. The reactor assembly according to claim 1, wherein one or more of the tubular arrangement and the light source arrangement defines a polygon.

6. The reactor assembly according to claim 3, wherein the part of the circle equals to 180° of the circle.

7. The reactor assembly according to claim 1, wherein at least part of the reactor support element is produced from aluminum.

8. The reactor assembly according to claim 1, wherein the reactor support element further comprises a tubular structure, wherein the tubular structure defines the track, and wherein the tubular structure partly encloses the tubular reactor.

9. The reactor assembly according to claim 8, wherein the tubular structure comprises tubing configured to host a cooling fluid during operation.

10. The reactor assembly according to claim 1, wherein the tubular reactor is helically coiled.

11. The reactor assembly according to claim 9, wherein the tubing is configured in thermal contact with the tubular reactor, and wherein the tubing and the tubular reactor are configured in a sandwich arrangement with the tubing sandwiching the tubular reactor.

12. The reactor assembly according to claim 1, wherein 20-50% of the reactor wall is in contact with the surface of the track.

13. The reactor assembly according to claim 1, wherein one or more of (i) the track, (ii) the surface of the track, and (iii) the tubing according to claim 9 comprises a reflective element, wherein the reflective element is reflective for light source radiation, and wherein the thermally conductive element comprises the reflective element.

14. A method for treating a fluid with light source radiation, wherein the method comprises:

providing the reactor assembly according to claim 1, wherein the reactor assembly comprises the photoreactor assembly;

providing the fluid to be treated with the light source radiation in the reactor;

irradiating the fluid with the light source radiation, and cooling the reactor support element.

15. A method for providing a reactor assembly according to claim 1, wherein the method comprises:

providing a reactor comprising a reactor wall, wherein the reactor wall defines a tubular reactor;

providing a reactor support element comprising a track, wherein the reactor support element comprises a thermally conductive element;

arranging the tubular reactor in a tubular arrangement, wherein the track partly encloses the tubular reactor, and wherein the tubular reactor is configured in thermal contact with the thermally conductive element;

wherein the method further comprises:

providing a support element base material and fabricating the reactor support element comprising the track from the support element base material, wherein fabricating the reactor support element comprising the track comprises forming the support element and optionally arranging a tubular structure at the reactor support element, and wherein forming the support element comprises one or more of (i) machine tooling the support element base material, (ii) extruding the support element base material, (iii) die casting the support element base material, and (iv) die casting the base material.

* * * * *